（12） United States Patent
Machida

(10) Patent No.: US 11,079,577 B2
(45) Date of Patent: Aug. 3, 2021

(54) VARIABLE MAGNIFICATION OPTICAL SYSTEM, OPTICAL APPARATUS, AND METHOD FOR PRODUCING VARIABLE MAGNIFICATION OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 122 days.

(21) Appl. No.: 16/496,429

(22) PCT Filed: Apr. 5, 2017

(86) PCT No.: PCT/JP2017/014196
§ 371 (c)(1),
(2) Date: Sep. 21, 2019

(87) PCT Pub. No.: WO2018/185869
PCT Pub. Date: Oct. 11, 2018

(65) Prior Publication Data
US 2021/0109331 A1 Apr. 15, 2021

(51) Int. Cl.
*G02B 13/00* (2006.01)
*G02B 15/20* (2006.01)
(Continued)

(52) U.S. Cl.
CPC ......... *G02B 15/20* (2013.01); *G02B 13/0045* (2013.01); *G02B 13/02* (2013.01);
(Continued)

(58) Field of Classification Search
CPC .... G02B 13/0045; G02B 13/18; G02B 13/06; G02B 5/005; G02B 13/009; G02B 15/20; G02B 13/02
(Continued)

(56) References Cited

U.S. PATENT DOCUMENTS 7,567,389 B2 * 7/2009 Souma ........... G02B 15/145511
359/682
8,085,475 B2 * 12/2011 Miyazaki ....... G02B 15/145523
359/680

(Continued)

FOREIGN PATENT DOCUMENTS

CN 102445748 A 5/2012
JP H02-072316 A 3/1990
(Continued)

OTHER PUBLICATIONS

Office Action dated Mar. 12, 2021, in Chinese Patent Application No. 201780089387.4.

Primary Examiner — Evelyn A Lester
(74) Attorney, Agent, or Firm — SGPatents PLLC

(57) ABSTRACT

A variable magnification optical system comprising, in order from an object side, a first lens group having negative refractive power, a first intermediate lens group having positive refractive power, a second intermediate lens group having negative refractive power and a rear lens group; upon varying a magnification from a wide angle end state to a telephoto end state, a distance between the first lens group and the first intermediate lens group being varied, a distance between the first intermediate lens group and the second intermediate lens group being varied, and a distance between the second intermediate lens group and the rear lens group being varied; the rear lens group comprising at least one focusing lens group which is moved upon carrying out focusing from an infinitely distant object to a closely distant object and at least one lens component at an image side of the most image side focusing lens group in the focusing lens groups; and predetermined conditional expressions being satisfied, thereby the focusing lens group(s) being reduced in weight.

16 Claims, 26 Drawing Sheets

(51) Int. Cl.
*G02B 13/02* (2006.01)
*G02B 13/06* (2006.01)
*G02B 13/18* (2006.01)
*G02B 5/00* (2006.01)

(52) U.S. Cl.
CPC ............ *G02B 13/06* (2013.01); *G02B 13/18* (2013.01); *G02B 5/005* (2013.01); *G02B 13/009* (2013.01)

(58) Field of Classification Search
USPC ............... 359/676, 680–687, 713–715, 740, 359/749–753, 755, 761, 770, 781
See application file for complete search history.

(56) References Cited

U.S. PATENT DOCUMENTS

| | | | |
|---|---|---|---|
| 2001/0013978 A1* | 8/2001 | Mihara | G02B 15/177 359/680 |
| 2004/0125462 A1* | 7/2004 | Misaka | G02B 15/1465 359/684 |
| 2004/0130801 A1* | 7/2004 | Mihara | G02B 15/177 359/680 |
| 2012/0081796 A1 | 4/2012 | Ohata | |
| 2013/0201370 A1 | 8/2013 | Hatada | |
| 2014/0139722 A1* | 5/2014 | Sugita | G02B 15/173 359/684 |
| 2014/0211082 A1* | 7/2014 | Imaoka | G02B 15/22 359/676 |
| 2015/0146044 A1* | 5/2015 | Sugita | G02B 15/173 359/683 |
| 2015/0253550 A1* | 9/2015 | Hosoi | G02B 15/14 359/686 |
| 2015/0338622 A1* | 11/2015 | Kuzuhara | H04N 5/2254 359/683 |
| 2016/0097920 A1* | 4/2016 | Nakahara | G02B 15/20 359/684 |
| 2016/0124200 A1* | 5/2016 | Obikane | G02B 13/009 359/684 |
| 2016/0341939 A1 | 11/2016 | Koida | |
| 2020/0026048 A1* | 1/2020 | Machida | G02B 15/177 |
| 2020/0026049 A1* | 1/2020 | Machida | G02B 15/22 |
| 2020/0341246 A1* | 10/2020 | Machida | G02B 13/18 |
| 2020/0341251 A1* | 10/2020 | Machida | G02B 15/1461 |
| 2021/0033834 A1* | 2/2021 | Machida | G02B 15/177 |

FOREIGN PATENT DOCUMENTS

| | | |
|---|---|---|
| JP | 2013-160944 A | 8/2013 |
| JP | 2014-149483 A | 8/2014 |
| JP | 2014-160229 A | 9/2014 |
| JP | 2015-121768 A | 7/2015 |
| JP | 2015-125383 A | 7/2015 |
| WO | WO 2016/121944 A1 | 8/2016 |

* cited by examiner

VARIABLE MAGNIFICATION OPTICAL SYSTEM, OPTICAL APPARATUS, AND METHOD FOR PRODUCING VARIABLE MAGNIFICATION OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is suitable to be used for a photographic camera, an electronic still camera, a video camera or the like. For example, refer to Japanese Patent application Laid-Open Gazette No. 2013-160944. However, in the conventional variable magnification optical system a focusing lens group has not been made sufficiently light in weight.

PRIOR ART REFERENCE

Patent Document

Patent Document 1: Japanese Patent application Laid-Open Gazette No. 2013-160944.

SUMMARY OF THE INVENTION

According to the present invention, there is provided a variable magnification optical system comprising, in order from an object side, a first lens group having negative refractive power, a first intermediate lens group having positive refractive power, a second intermediate lens group having negative refractive power and a rear lens group;

upon varying a magnification from a wide angle end state to a telephoto end state, a distance between said first lens group and said first intermediate lens group being varied, a distance between said first intermediate lens group and said second intermediate lens group being varied, and a distance between said second intermediate lens group and said rear lens group being varied;

said rear lens group comprising at least one focusing lens group which is moved upon carrying out focusing from an infinite distance object to a close distance object and at least one lens component at an image side of the most image side focusing lens group in said focusing lens groups; and the following conditional expressions being satisfied:

$$0.30 < |fF|/|fRL| < 2.50$$

$$0.10 < BFw/fw < 1.00$$

where fF denotes a focal length of a focus lens group having a strongest refractive power in said focusing lens groups, fRL denotes a focal length of a lens having a strongest refractive power in said at least one lens component, BFw denotes a back focus of said variable magnification optical system in the wide angle end state, and fw denotes a focal length of said variable magnification optical system in the wide angle end state.

Further, according to the present invention, there is provided a method for manufacturing a variable magnification optical system comprising, in order from an object side, a first lens group having negative refractive power, a first intermediate lens group having positive refractive power, a second intermediate lens group having negative refractive power and a rear lens group; comprising steps of:

constructing such that, upon varying a magnification from a wide angle end state to a telephoto end state, a distance between said first lens group and said first intermediate lens group is varied, a distance between said first intermediate lens group and said second intermediate lens group is varied, and a distance between said second intermediate lens group and said rear lens group is varied;

constructing such that said rear lens group comprising at least one focusing lens group which is moved upon carrying out focusing from an infinite distance object to a close distance object and at least one lens component at an image side of the most image side focusing lens group in said focusing lens groups; and constructing such that the following conditional expressions being satisfied:

$$0.30 < |fF|/|fRL| < 2.50$$

$$0.10 < BFw/fw < 1.00$$

where fF denotes a focal length of a focus lens group having a strongest refractive power in said focusing lens groups, fRL denotes a focal length of a lens having a strongest refractive power in said at least one lens component, BFw denotes a back focus of said variable magnification optical system in the wide angle end state, and fw denotes a focal length of said variable magnification optical system in the wide angle end state.

EMBODIMENT FOR CARRYING OUT THE INVENTION

Figure 1:
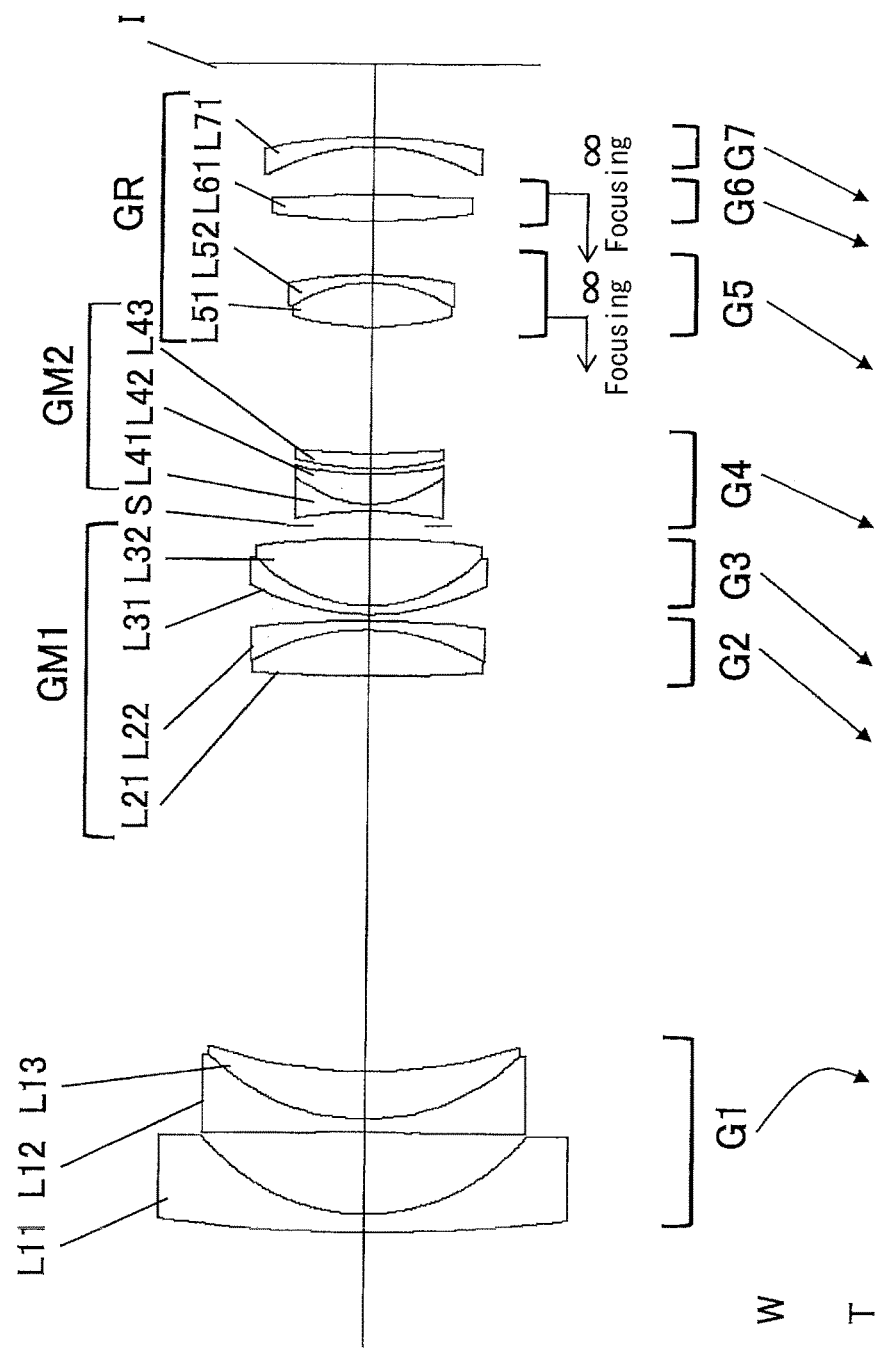
FIG. 1 is a sectional view of a variable magnification optical system according to a First Example.

Next, a variable magnification optical system according to the present embodiment, an optical apparatus and a method for producing the variable magnification optical system, will be explained.

The variable magnification optical system according to the present embodiment comprises, in order from an object side, a first lens group having negative refractive power, a first intermediate lens group having positive refractive power, a second intermediate lens group having negative refractive power and a rear lens group;

upon varying a magnification from a wide angle end state to a telephoto end state, a distance between said first lens group and said first intermediate lens group being varied, a distance between said first intermediate lens group and said second intermediate lens group being varied, and a distance between said second intermediate lens group and said rear lens group being varied;

said rear lens group comprising at least one focusing lens group which is moved upon carrying out focusing from an infinite distance object to a close distance object and at least one lens component at an image side of the most image side focusing lens group in said focusing lens groups; and the following conditional expressions (1) and (2) being satisfied:

$$0.30 < |fF|/|fRL| < 2.50 \quad (1)$$

$$0.10 < BFw/fw < 1.00 \quad (2)$$

where fF denotes a focal length of a focus lens group having a strongest refractive power in said focusing lens groups, fRL denotes a focal length of a lens having a strongest refractive power in said at least one lens component, BFw denotes a back focus of said variable magnification optical system in the wide angle end state, and fw denotes a focal length of said variable magnification optical system in the wide angle end state.

Here, in the present embodiment, the first intermediate lens group, the second intermediate lens group and the rear lens group, each comprise at least one lens group. Meanwhile, in the present embodiment, a lens group means a portion which comprises at least one lens separated by an air space.

The variable magnification optical system according to the present embodiment comprises at least four lens groups and changes distances between the neighboring lens groups upon varying magnification from the wide angle end state to the telephoto end state, thereby being able to attain superb aberration correction upon varying magnification. Moreover, the focusing lens group(s) can be downsized and made light in weight by arranging the focusing lens group(s) in the rear lens group.

Further, said rear lens group comprises at least one lens component at an image side of the most image side focusing lens group in said focusing lens groups. With such a configuration, it is possible to suppress variation in coma aberration upon conducting focusing from an infinite distance object to a close distance object. Meanwhile, by the term "lens component" in the present specification is meant a single lens or a cemented lens.

The conditional expression (1) defines a ratio of a focal length of a lens group having the strongest refractive power in the focusing lens groups relative to a focal length of a lens having a strongest refractive power in at least one lens component at an image side of a most image side focusing group in the focusing lens groups in the rear lens group.

With satisfying the conditional expression (1), in the variable magnification optical system according to the present embodiment, a lens barrel is not made larger in size, but can suppress variations in spherical aberration and other various aberrations upon conducting focusing from an infinite distance object to a close distance object.

When the value of |fF|/|fRL| is equal to or exceeds the upper limit of the conditional expression (1) of the variable magnification optical system of the present application, refractive power of the lens having the strongest refractive power in the at least one lens component at the image side of the most image side focusing lens group in the focusing lens groups in the rear lens group, becomes strong, and it becomes difficult to suppress variation in coma aberration upon conducting focusing from an infinite distance object to a close distance object. Further, refractive power of the focusing lens group(s) becomes weak, so an amount of movement of the focusing lens group(s) upon conducting focusing from an infinite distance object to a close distance object, becomes too large, so that the lens barrel becomes larger in size. Meanwhile, it is preferable to set the upper limit value of the conditional expression (1) to 2.40, and more preferable to 2.30.

On the other hand, when the value of |fF|/|fRL| is equal to or falls below the lower limit of the conditional expression (1) of the variable magnification optical system of the present application, refractive power of the focusing lens group(s) becomes(become) strong, and it becomes difficult to suppress variation in spherical aberration upon conducting focusing from an infinite distance object to a close distance object. Meanwhile, it is preferable to set the lower limit value of the conditional expression (1) to 0.40, and more preferable to 0.50.

The conditional expression (2) defines a ratio of a back focus of said variable magnification optical system in the wide angle end state relative to a focal length of said variable magnification optical system in the wide angle end state. With satisfying the conditional expression (2), the variable magnification optical system according to the present embodiment can correct effectively coma aberration and other various aberrations in the wide angle end state. Meanwhile, the term "back focus" means a distance along the optical axis from the most image side lens surface to the image plane.

When the value of BFw/fw is equal to or exceeds the upper limit of the conditional expression (2) of the variable magnification optical system of the present embodiment, the back focus in the wide angle end state relative to the focal length in the wide angle end state becomes large, and it becomes difficult to correct coma aberration and other various aberrations in the wide angle end state. Meanwhile, it is preferable to set the upper limit value of the conditional expression (2) to 0.95, further preferable to 0.90 and further more preferable to 0.85, and still further preferable to 0.80.

On the other hand, when the value of BFw/fw is equal to or falls below the lower limit value of the conditional expression (2) of the variable magnification optical system of the present embodiment, the back focus in the wide angle end state relative to the focal length in the wide angle end state becomes small, and it becomes difficult to correct coma aberration and other various aberrations in the wide angle end state. It becomes difficult also to arrange mechanical members of lens barrel. Meanwhile, it is preferable to set the lower limit value of the conditional expression (2) to 0.20, further preferable to 0.25, further more preferable to 0.30 and still further preferable to 0.40.

With the above mentioned configurations, it is possible to realize the variable magnification optical system which has excellent optical performance, and in which the focusing lens group(s) is(are) made light in weight.

In the variable magnification optical system according to the present embodiment, it is desirable that the following conditional expression (3) is satisfied:

$$0.70 < |fF|/ft < 3.30 \quad (3)$$

where fF denotes a focal length of a focusing lens group having a strongest refractive power in the focusing lens groups, and ft denotes a focal length of the variable magnification optical system in the telephoto end state.

The conditional expression (3) defines a ratio of a focal length of the focusing lens group having the strongest refractive power in the focusing lens groups, relative to a focal length of the variable magnification optical system in the telephoto end state.

With satisfying the conditional expression (3), the variable magnification optical system according to the present embodiment can suppress variations in spherical aberration and other various aberrations upon carrying out focusing from an infinite distance object to a close distance object, without making the lens barrel large.

When the value of |fF|/ft is equal to or exceeds the upper limit value of the conditional expression (3) of the variable magnification optical system according to the present embodiment, refractive power of the focusing lens group becomes weak, and an amount of movement of the focusing lens group upon carrying out focusing from the infinite distance object to the close distance object becomes large so that the lens barrel becomes large in size. Meanwhile, it is preferable to set the upper limit value of the conditional expression (3) to 3.20 and further preferable to 3.10.

On the other hand, when the value of |fF|/ft in the conditional expression (3) of the variable magnification optical system according to the present embodiment, is equal to or falls below the lower limit value, refractive power of the focusing lens group becomes strong, and it becomes difficult to suppress variation in spherical aberration upon carrying out focusing from the infinite distance object to the close distance object. Meanwhile, it is preferable to set the lower limit value of the conditional expression (3) to 0.75, and further preferable to 0.80.

Further, in the variable magnification optical system according to the present embodiment, it is desirable that the following conditional expression (4) is satisfied:

$$0.60 < f1N/f1 < 2.20 \quad (4)$$

where f1N denotes a focal length of a lens having a strongest negative refractive power in the first lens group, and f1 denotes a focal length of the first lens group.

The conditional expression (4) defines a ratio of the focal length of the lens having the strongest negative refractive power in the first lens group to the focal length of the first lens group.

With satisfying the conditional expression (4), the variable magnification optical system according to the present embodiment can correct effectively coma aberration and other various aberrations and suppress variations in spherical aberration and other various aberrations upon varying magnification from a wide angle end state to a telephoto end state.

When the value of f1N/f1 is equal to or exceeds the upper limit value of the conditional expression (4) of the variable magnification optical system according to the present embodiment, refractive power of the first lens group becomes strong, and it becomes difficult to suppress variations in spherical aberration and other various aberrations upon varying magnification from the wide angle end state to the telephoto end state. Meanwhile, it is preferable to set the upper limit value of the conditional expression (4) to 1.90 and further preferable to 1.80.

On the other hand, when the value of f1N/f1 in the conditional expression (4) of the variable magnification optical system according to the present embodiment, is equal to or falls below the lower limit value, refractive power of the lens having the strongest negative refractive power in the first lens group becomes strong, and it becomes difficult to suppress coma aberration and other various aberrations. Meanwhile, it is preferable to set the lower limit value of the conditional expression (4) to 0.70, further preferable to 0.80, and furthermore preferable to 0.90.

In the variable magnification optical system according to the present embodiment, it is desirable that the following conditional expression (5) is satisfied:

$$2.00 < D1Mw/fw < 4.00 \tag{5}$$

where D1Mw denotes a distance along the optical axis between the first lens group and the first intermediate lens group in the wide angle end state, and fw denotes the focal length of the variable magnification optical system in the wide angle end state.

The conditional expression (5) defines a ratio of the distance along the optical axis between the first lens group and the first intermediate lens group in the wide angle end state to the focal length of the variable magnification optical system in the wide angle end state.

With satisfying the conditional expression (5), the variable magnification optical system according to the present embodiment can effectively correct coma aberration and other various aberrations in the wide angle end state without making the size of a lens barrel large.

When the value of D1Mw/fw is equal to or exceeds the upper limit value of the conditional expression (5) of the variable magnification optical system according to the present embodiment, the distance along the optical axis between the first lens group and the first intermediate lens group in the wide angle end state, becomes large, and thereby the size of the lens barrel becomes large. Meanwhile, it is preferable to set the upper limit value of the conditional expression (5) to 3.90 and further preferable to 3.80.

On the other hand, when the value of D1Mw/fw in the conditional expression (5) of the variable magnification optical system according to the present embodiment, is equal to or falls below the lower limit value, the distance along the optical axis between the first lens group and the first intermediate lens group in the wide angle end state, becomes small, and it becomes difficult to correct effectively coma aberration and other various aberrations in the wide angle end state. Meanwhile, it is preferable to set the lower limit value of the conditional expression (5) to 2.10, and further preferable to 2.20.

In the variable magnification optical system according to the present embodiment, it is desirable that the following conditional expression (6) is satisfied:

$$2.00 < vM1P/vM1N < 3.00 \tag{6}$$

where vM1P denotes an Abbe's number of a lens having a strongest positive refractive power in the first intermediate lens group, and vM1N denotes an Abbe's number of a lens having a strongest negative refractive power in the first intermediate lens group.

The conditional expression (6) defines a ratio of the Abbe's number of the lens having the strongest positive refractive power in the first intermediate lens group to the Abbe's number of the lens having the strongest negative refractive power in the first intermediate lens group. With satisfying the conditional expression (6), the variable magnification optical system according to the present embodiment can correct effectively chromatic aberration.

When the value of vM1P/vM1N is equal to or exceeds the upper limit value of the conditional expression (6) of the variable magnification optical system according to the present embodiment, the Abbe's number of the lens having the strongest negative refractive power in the first intermediate lens group, becomes small, and thereby correction of chromatic aberration becomes excessive. Meanwhile, it is preferable to set the upper limit value of the conditional expression (6) to 2.95, further preferable to 2.90 and furthermore preferable to 2.85.

On the other hand, when the value of vM1P/vM1N in the conditional expression (6) of the variable magnification optical system according to the present embodiment, is equal to or falls below the lower limit value, the Abbe's number of the lens having the strongest positive refractive power in the first intermediate lens group becomes small and generation of the chromatic aberration becomes excessive, thereby it becoming difficult to correct it.

Meanwhile, it is preferable to set the lower limit value of the conditional expression (6) to 2.05, further preferable to 2.10 and furthermore preferable to 2.15.

In the variable magnification optical system according to the present embodiment, it is desirable that the following conditional expression (7) is satisfied:

$$0.20 < fM1P/fM1N < 0.80 \tag{7}$$

where fM1P denotes a focal length of a lens having a strongest positive refractive power in the first intermediate lens group, and fM1N denotes a focal length of a lens having a strongest negative refractive power in the first intermediate lens group.

The conditional expression (7) defines a ratio of the focal length of the lens having the strongest positive refractive power in the first intermediate lens group to the focal length of the lens having the strongest negative refractive power in the first intermediate lens group. With satisfying the conditional expression (7), the variable magnification optical system according to the present embodiment can correct effectively spherical aberration and other various aberrations.

When the value of fM1P/fM1N is equal to or exceeds the upper limit value of the conditional expression (7) of the variable magnification optical system according to the present embodiment, refractive power of the lens having the strongest negative refractive power in the first intermediate lens group, becomes strong, and thereby correction of spherical aberration becomes excessive. Meanwhile, it is preferable to set the upper limit value of the conditional expression (7) to 0.75, and further preferable to set it to 0.70.

On the other hand, when the value of fM1P/fM1N in the conditional expression (7) of the variable magnification optical system according to the present embodiment, is equal to or falls below the lower limit value, refractive power of the lens having the strongest positive refractive power in the first intermediate lens group becomes strong and generation of the spherical aberration becomes excessive, thereby it becoming difficult to correct it. Meanwhile, it is preferable to set the lower limit value of the conditional expression (7) to 0.25, and further preferable to set it to 0.30.

In the variable magnification optical system according to the present embodiment, it is desirable that the following conditional expression (8) is satisfied:

$$38.00° < \omega w < 85.00° \quad (8)$$

where ωw denotes a half angle of view of the variable magnification optical system in the wide angle end state.

The conditional expression (8) defines a condition defining an optimal value of the angle of view in the wide angle end state. With satisfying the conditional expression (8), the variable magnification optical system according to the present embodiment can correct superbly various aberrations such as coma aberration, distortion, and curvature of field, while having wide angle of view.

It is preferable to set the upper limit value of the conditional expression (8) to 84.00° in order to make the effect of the present embodiment secure.

In order to make the effect of the present embodiment secure, it is preferable to set the lower limit value of the conditional expression (8) to 39.00°, further to 40.00°, and furthermore to 41.00°.

In the variable magnification optical system according to the present embodiment, it is desirable that the focusing lens group is composed of one or two lenses. With this configuration, the focusing lens group may be downsized and made light in weight.

Further, in the variable magnification optical system according to the present embodiment, it is desirable that the first intermediate lens group comprises at least two lens components having negative refractive power. With this configuration, it is possible to correct effectively spherical aberration and chromatic aberration in the telephoto end state.

Further, in the variable magnification optical system according to the present embodiment, it is desirable that the first lens group is composed of two lens components. With this configuration, even if manufacturing error occurs, mass productivity can be attained.

Further, in the variable magnification optical system according to the present embodiment, it is desirable that at least one of said focusing lens groups has positive refractive power. With this configuration, it is possible to suppress variations in spherical aberration and other various aberrations upon conducting focusing from an infinite distance object to a close distance object.

Further, in the variable magnification optical system according to the present embodiment, it is desirable that the first intermediate lens group comprises, in order from the object side, a second lens group having positive refractive power and a third lens group having positive refractive power. With this configuration, variations in spherical aberration and other various aberrations caused upon varying magnification from the wide angle end state to the telephoto end state, can be suppressed.

Further, in the variable magnification optical system according to the present embodiment, it is desirable that the rear lens group comprises at least two focusing lens groups. With this configuration, variations in spherical aberration and other various aberrations caused upon conducting focusing from an infinitely distant object to a close distance object, can be suppressed effectively.

Further, an optical apparatus of the present embodiment is equipped with the variable magnification optical system having the above described configuration, so it is possible to realize an optical apparatus which has superb optical performance and in which the focusing lens group is made light in weight.

Further, a method for manufacturing a variable magnification optical system according to the present embodiment, is a method for manufacturing a variable magnification optical system which comprises, in order from an object side, a first lens group having negative refractive power, a first intermediate lens group having positive refractive power, a second intermediate lens group having negative refractive power and a rear lens group, comprising the steps of:

constructing such that, upon varying a magnification from a wide angle end state to a telephoto end state, a distance between said first lens group and said first intermediate lens group is varied, a distance between said first intermediate lens group and said second intermediate lens group is varied, and a distance between said second intermediate lens group and said rear lens group is varied;

constructing such that said rear lens group comprising at least one focusing lens group which is moved upon carrying out focusing from an infinite distance object to a close distance object and at least one lens component at an image side of the most image side focusing lens group in said focusing lens groups; and constructing such that the following conditional expressions (1) and (2) are satisfied:

$$0.30 < |fF|/|fRL| < 2.50 \quad (1)$$

$$0.10 < BFw/fw < 1.00 \quad (2)$$

where fF denotes a focal length of a focus lens group having a strongest refractive power in said focusing lens groups, fRL denotes a focal length of a lens having a strongest refractive power in said at least one lens component, BFw denotes a back focus of said variable magnification optical system in the wide angle end state, and fw denotes a focal length of said variable magnification optical system in the wide angle end state.

Hereinafter, the variable magnification optical systems relating to numerical examples of the present embodiment will be explained with reference to the accompanying drawings.

First Example

FIG. 1 is a sectional view of a variable magnification optical system according to a First Example. Meanwhile, in FIG. 1 and FIG. 4, FIG. 7, FIG. 10, FIG. 13, FIG. 16, FIG. 19 and FIG. 22 described later, arrows show movement trajectories of the respective lens groups upon varying magnification from a wide angle end state (W) to a telephoto end state (T).

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of, in order from the object side, a second lens group G2 having positive refractive power and a third lens group G3 having positive refractive power.

The second intermediate lens group GM2 is composed of a fourth lens group G4.

The rear lens group GR is composed of, in order from the object side, a fifth lens group G5 having positive refractive power, a sixth lens group G6 having positive refractive power, and a seventh lens group G7 having negative refractive power.

The first lens group G1 consists of, in order from the object side, a negative meniscus lens L11 having a convex surface facing the object side, and a cemented negative lens constructed by a double concave negative lens L12 cemented with a positive meniscus lens L13 having a convex surface facing the object side.

The second lens group G2 consists of a cemented positive lens constructed by a double convex positive lens L21 cemented with a negative meniscus lens L22 having a concave surface facing the object side.

The third lens group G3 consists of a cemented positive lens constructed by a negative meniscus lens L31 having a convex surface facing the object side cemented with a double convex positive lens L32.

The fourth lens group G4 consists of, in order from the object side, a cemented negative lens constructed by a double concave negative lens L41 cemented with a positive meniscus lens L42 having a convex surface facing the object side, and a positive meniscus lens L43 having a convex surface facing the object side.

The fifth lens group G5 consists of a cemented positive lens constructed by a double convex positive lens L51 cemented with a negative meniscus lens L52 having a concave surface facing the object side.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving the fifth lens group G5 and the sixth lens group G6 independently from each other as respective focusing lens groups.

Table 1 below shows various values of the variable magnification optical system relating to the present Example.

In Table 1, "f" denotes a focal length, and "BF" denotes a back focus, that is, a distance along the optical axis from the most image side lens surface to the image plane I.

In [Surface Data], "m" denotes an order of an optical surface counted from the object side, "r" denotes a radius of curvature, "d" denotes a surface-to-surface distance, that is, an interval from an n-th surface to an (n+1)-th surface, where n is an integer, "nd" denotes refractive index for d-line (wavelength λ=587.6 nm) and "vd" denotes an Abbe number for d-line (wavelength λ=587.6 nm). Further, "OP" denotes an object surface, "Variable" denotes a variable surface-to-surface distance, "S" denotes an aperture stop, and "I" denotes an image plane. Meanwhile, radius of curvature r=∞ denotes a plane surface, and refractive index of the air nd=1.00000 is omitted. In addition, a position of an aspherical surface is expressed by attaching "*" to the surface number, and in the column of the radius of curvature "r", a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+\{1-\kappa(h/r)^2\}^{1/2}]+A4h^4+A6h^6+A8h^8+A10h^{10}$$

where "h" denotes a height in the direction perpendicular to the optical axis, "x" denotes a sag amount that is a distance along the optical axis from the tangent surface at the vertex of each aspherical surface at the height "h"; "κ" denotes a conical coefficient; "A4", "A6", "A8" and "A10" denote respective aspherical coefficients, and "r" denotes a paraxial radius of curvature that is a radius of curvature of a reference sphere. "E-n", where n is an integer, denotes "×10$^{-n}$", for example, "1.234E-05" denotes "1.234×10$^{-5}$". Second order aspherical coefficient "A2" is 0 and omitted.

In [Various Data], "FNO" denotes an F-number, "2ω" denotes an angle of view (unit "°"), "Ymax" denotes a maximum image height, and "TL" denotes a total length of the variable magnification optical system according to the present Example, that is, a distance along the optical axis from the first lens surface to the image plane I, and "dn" denotes a variable distance from the n-th surface to the (n+1)-th surface. Meanwhile, "W" denotes a wide angle end state, "M" denotes an intermediate focal length state, "T" denotes a tele photo end state, "INF" denotes time upon focusing on an infinite distance object, and "CLO" denotes time upon focusing on a close distance object.

In [Lens Group Data], a starting surface ST and a focal length f of each lens group are shown.

In [Values for Conditional Expressions], values corresponding to respective conditional expressions of the variable magnification optical system according to the present Example, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "m".

Meanwhile, the explanation of reference symbols in Table 1 described above, is the same in Tables for the other Examples described herein later.

TABLE 1

First Example

[Surface Data]

| m | r | d | nd | vd |
|---|---|---|---|---|
| OP | ∞ | 2.900 | | |
| 1 | 270.0000 | 2.900 | 1.74389 | 49.53 |
| *2 | 33.2562 | 13.215 | | |
| 3 | −1900.2102 | 2.100 | 1.59349 | 67.00 |
| 4 | 35.8236 | 7.700 | 2.00100 | 29.12 |
| 5 | 79.6938 | Variable | | |
| 6 | 271.3181 | 7.400 | 1.83481 | 42.73 |
| 7 | −36.9149 | 1.500 | 1.75520 | 27.57 |
| 8 | −164.0000 | Variable | | |
| 9 | 39.7511 | 1.500 | 1.85000 | 27.03 |
| 10 | 25.6246 | 10.800 | 1.59319 | 67.90 |
| 11 | −134.6401 | Variable | | |
| 12(S) | ∞ | 2.350 | | |
| 13 | −65.9523 | 1.300 | 1.80100 | 34.92 |
| 14 | 18.5797 | 4.700 | 1.90366 | 31.27 |
| 15 | 51.6074 | 0.919 | | |
| 16 | 45.9293 | 2.500 | 1.94595 | 17.98 |
| 17 | 120.0000 | Variable | | |
| 18 | 47.5350 | 7.100 | 1.48749 | 70.31 |
| 19 | −24.2409 | 1.300 | 1.69895 | 30.13 |
| 20 | −74.7188 | Variable | | |
| 21 | 113.0000 | 4.200 | 1.58913 | 61.15 |
| *22 | −108.0000 | Variable | | |
| *23 | −30.5616 | 1.500 | 1.58913 | 61.15 |
| 24 | −81.9388 | BF | | |
| I | ∞ | | | |

[Aspherical Data]

m: 2

K = 0.0000
A4 = 2.97162E−06
A6 = 1.62510E−09
A8 = 2.42658E−13
A10 = 4.56491E−16
A12 = 8.02650E−19 m: 22

K = 1.0000
A4 = 8.43912E−06
A6 = 6.68890E−10
A8 = 1.69267E−11
A10 = −5.36609E−14 m: 23

K = 1.0000
A4 = 8.13845E−06
A6 = −4.05875E−09
A8 = 1.66491E−11
A10 = −5.84964E−14

[Various Data]
Variable magnification ratio 2.99

| | W | M | T |
|---|---|---|---|
| f | 22.7 | 50.0 | 67.9 |
| FNO | 2.92 | 2.92 | 2.92 |
| 2ω | 91.10 | 45.68 | 33.64 |
| Ymax | 19.32 | 21.60 | 21.60 |
| TL | 188.45 | 157.95 | 163.95 |
| BF | 11.75 | 20.19 | 25.26 |

| | W INF | M INF | T INF | W CLO | M CLO | T CLO |
|---|---|---|---|---|---|---|
| d5 | 63.985 | 10.998 | 3.100 | 63.985 | 10.998 | 3.100 |
| d8 | 1.000 | 1.763 | 1.000 | 1.000 | 1.763 | 1.000 |
| d11 | 1.900 | 12.973 | 26.707 | 1.900 | 12.973 | 26.707 |
| d17 | 20.431 | 12.752 | 12.052 | 20.013 | 11.839 | 10.654 |
| d20 | 8.701 | 16.480 | 16.780 | 8.112 | 16.125 | 16.831 |
| d22 | 7.699 | 9.815 | 6.069 | 8.705 | 11.084 | 7.415 |

TABLE 1-continued

First Example

[Lens Group Data]

| Group | ST | f |
|---|---|---|
| 1 | 1 | −46.132 |
| 2 | 6 | 102.733 |
| 3 | 9 | 64.434 |
| 4 | 12 | −89.031 |
| 5 | 18 | 92.237 |
| 6 | 21 | 94.399 |
| 7 | 23 | −83.639 |

[Values for Conditional Expressions]

| (1) | |fF|/|fRL| = 1.103 |
|---|---|
| (2) | BFw/fw = 0.518 |
| (3) | |fF|/ft = 1.358 |
| (4) | f1N/f1 = 1.111 |
| (5) | D1Mw/fw = 2.819 |
| (6) | νM1P/νM1N = 2.463 |
| (7) | fM1P/fM1N = 0.587 |
| (8) | ωw = 45.55° |

Figure 2A:
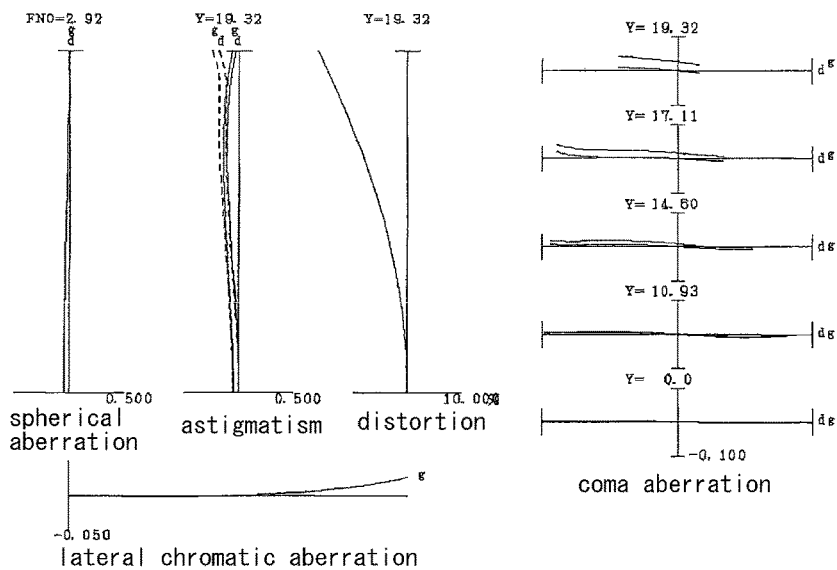
FIG. 2A, FIG. 2B and FIG. 2C are graphs showing various aberrations upon focusing on an infinite distance object, respectively, in the wide angle end state, in the intermediate focal length state, and in the telephoto end state, of the variable magnification optical system according to the First Example.
Figure 2B:
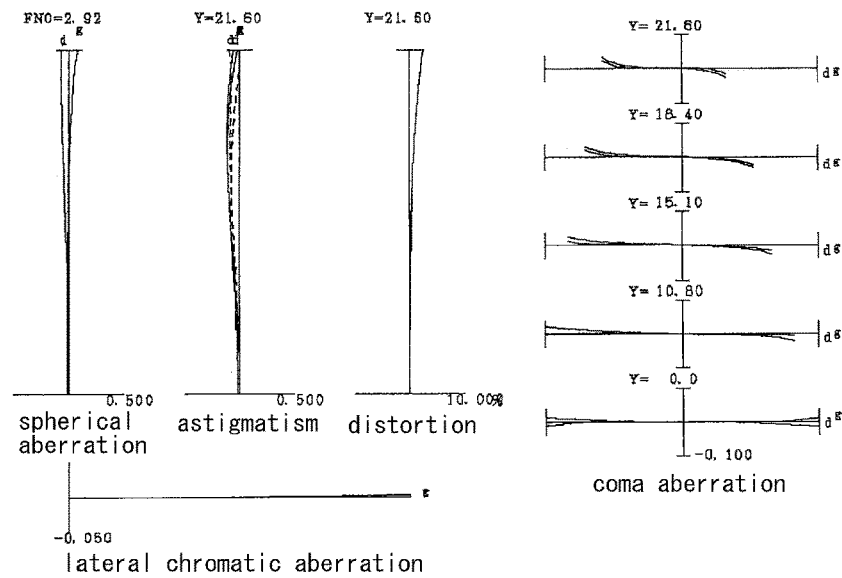
Figure 2C:
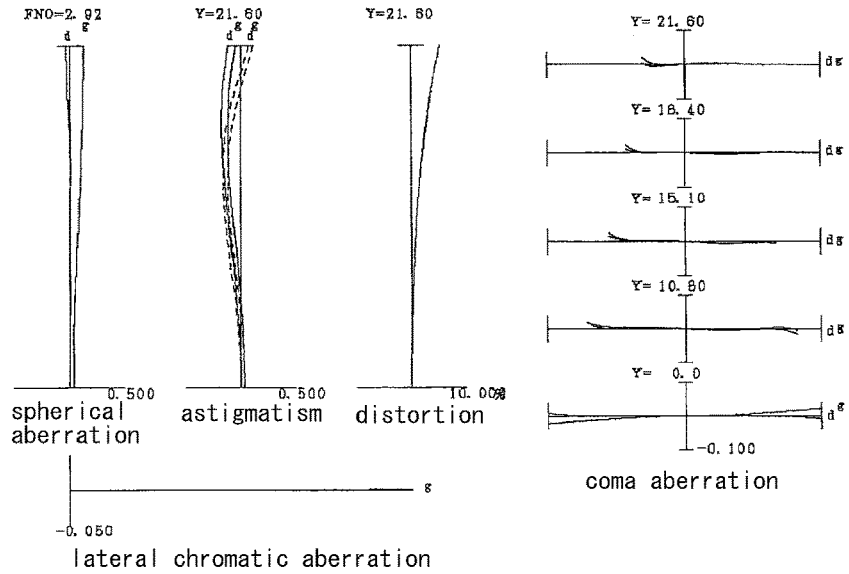

FIGS. 2A, 2B and 2C are graphs showing various aberrations upon focusing on an infinite distance object, respectively, in the wide angle end state, in the intermediate focal length state and in the telephoto end state, of the variable magnification optical system according to the First Example.

Figure 3A:
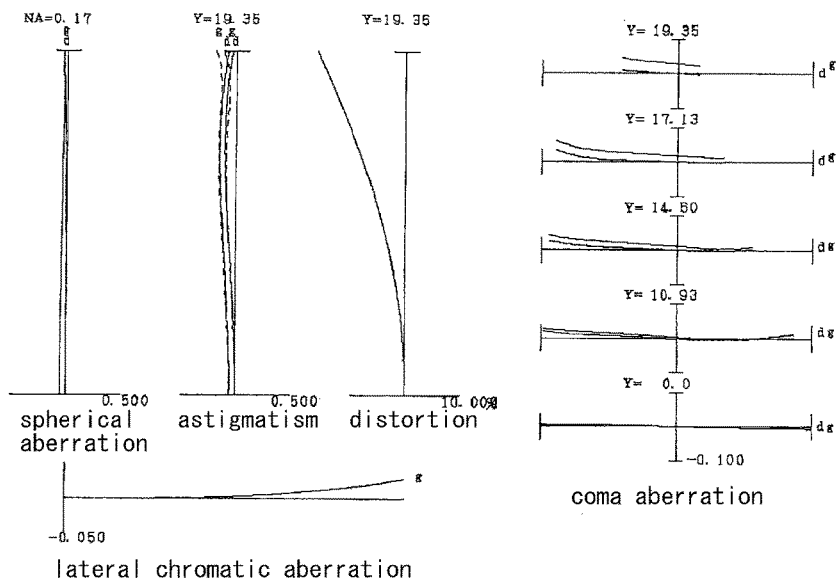
FIG. 3A, FIG. 3B and FIG. 3C are graphs showing various aberrations upon focusing on a close distance object, respectively, in the wide angle end state, in the intermediate focal length state, and in the telephoto end state, of the variable magnification optical system according to the First Example.
Figure 3B:
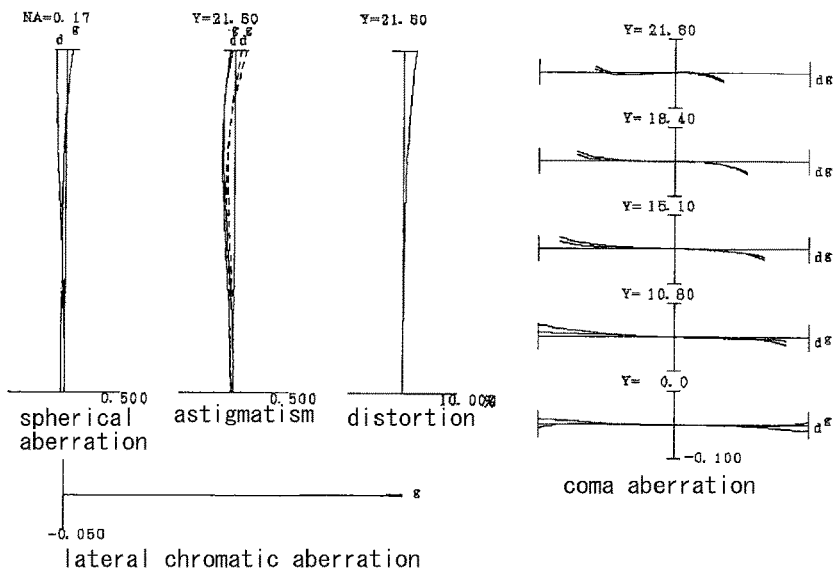
Figure 3C:
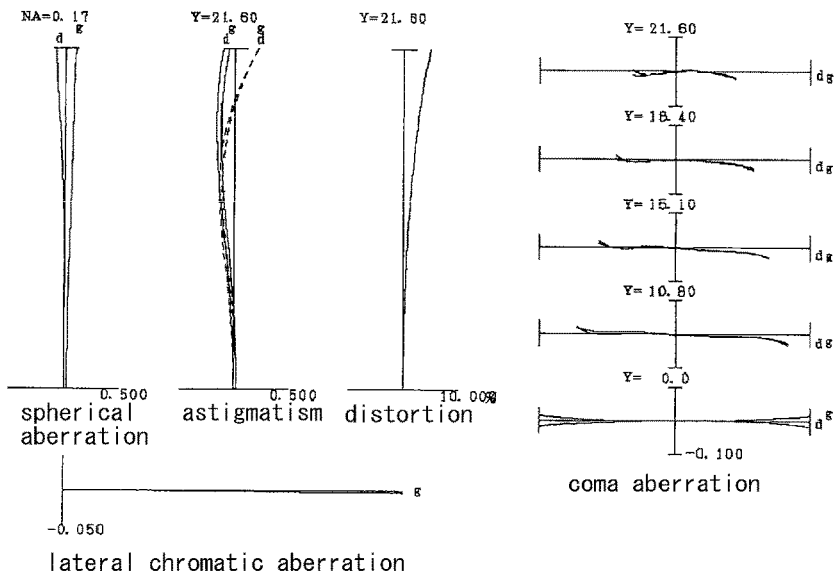

FIGS. 3A, 3B and 3C are graphs showing various aberrations upon focusing on a close distance object, respectively, in the wide angle end state, in the intermediate focal length state and in the telephoto end state, of the variable magnification optical system according to the First Example.

In the graphs showing aberrations as drawn in FIG. 2 and FIG. 3, "FNO" denotes an F-number, "NA" denotes a numerical aperture, and "Y" denotes an image height. In graphs showing spherical aberration, the value of the numerical aperture or F-number corresponding to the maximum aperture is shown. In graphs showing astigmatism and distortion, the maximum value of the image height is shown. In graphs showing coma aberration, the value for each image height is shown. "d" denotes d-line (wavelength λ=587.6 nm), and "g" denotes g-line (wavelength λ=435.8 nm). In graphs showing astigmatism, a solid line indicates a sagittal image plane, and a broken line indicates a meridional image plane. Meanwhile, in graphs showing various aberrations in the other Examples as described below, the same symbols as in the present Example are employed.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

Second Example

Figure 4:
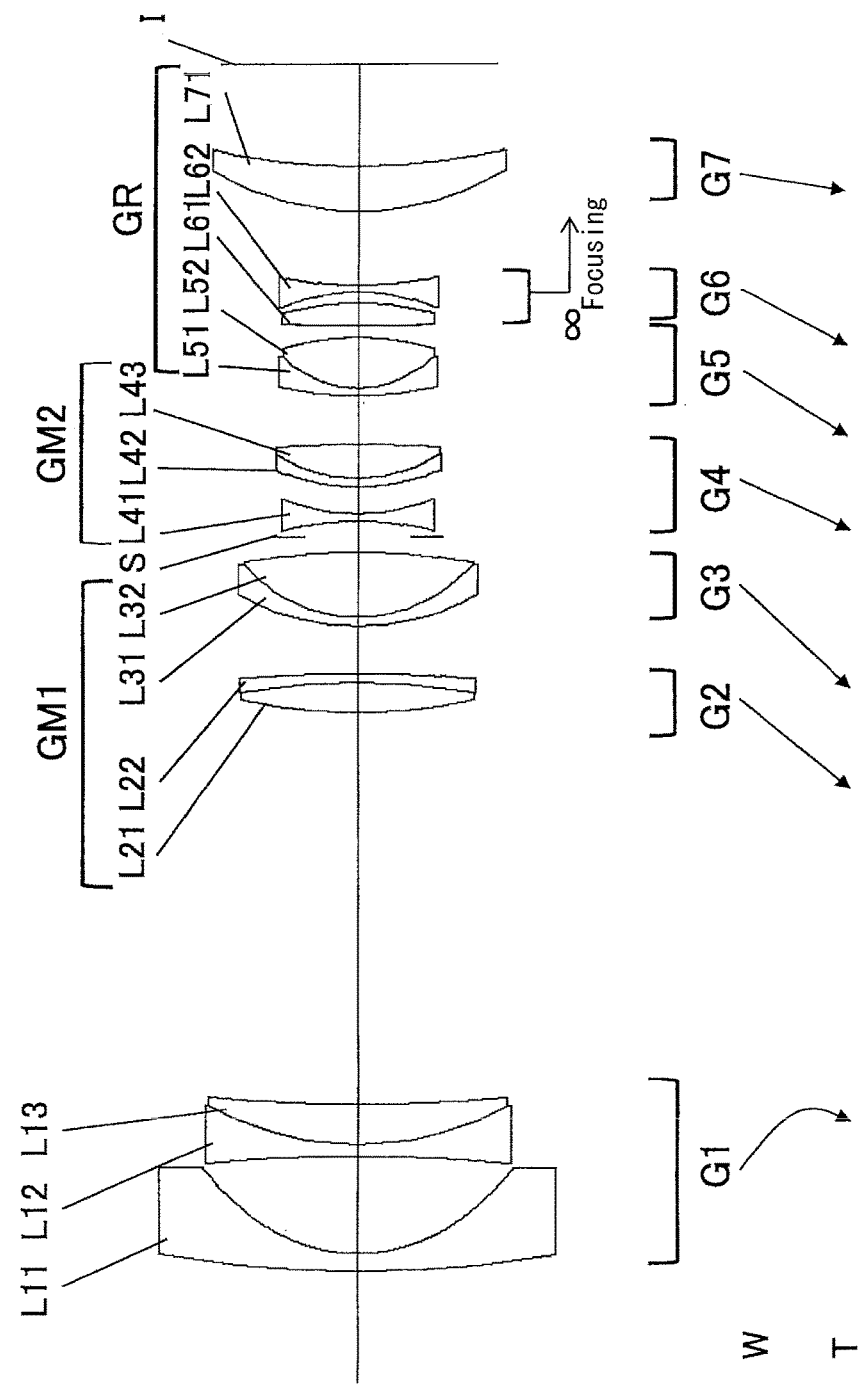
FIG. 4 is a sectional view of a variable magnification optical system according to a Second Example.

FIG. 4 is a sectional view of a variable magnification optical system according to a Second Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of, in order from the object side, a second lens group G2 having positive refractive power and a third lens group G3 having positive refractive power.

The second intermediate lens group GM2 is composed of a fourth lens group G4.

The rear lens group GR is composed of, in order from the object side, a fifth lens group G5 having positive refractive power, a sixth lens group G6 having negative refractive power, and a seventh lens group G7 having positive refractive power.

The first lens group G1 consists of, in order from the object side, a negative meniscus lens L11 having a convex surface facing the object side, and a cemented positive lens constructed by a double concave negative lens L12 cemented with a positive meniscus lens L13 having a convex surface facing the object side.

The second lens group G2 consists of a cemented positive lens constructed by a double convex positive lens L21 cemented with a negative meniscus lens L22 having a concave surface facing the object side.

The third lens group G3 consists of a cemented positive lens constructed by a negative meniscus lens L31 having a convex surface facing the object side cemented with a double convex positive lens L32.

The fourth lens group G4 consists of, in order from the object side, a double concave negative lens L41 and a cemented positive lens constructed by a negative meniscus lens L42 having a convex surface facing the object side cemented with a double convex positive lens L43.

The fifth lens group G5 consists of a cemented positive lens constructed by a negative meniscus lens L51 having a convex surface facing the object side cemented with a double convex positive lens L52.

The sixth lens group G6 consists of, in order from the object side, a double convex positive lens L61 and a double concave negative lens L62.

The seventh lens group G7 consists of a positive meniscus lens L71 having a convex surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving the sixth lens group G6 toward the image plane as focusing lens group.

Table 2 below shows various values of the variable magnification optical system relating to the present Example.

TABLE 2

Second Example

[Surface Data]

| m | r | d | nd | νd |
|---|---|---|---|---|
| OP | ∞ | | | |
| 1 | 199.9946 | 2.900 | 1.74389 | 49.53 |
| *2 | 27.7434 | 15.922 | | |
| *3 | −285.3676 | 2.100 | 1.67798 | 54.89 |
| 4 | 50.5985 | 6.605 | 2.00100 | 29.14 |
| 5 | 262.0850 | Variable | | |
| 6 | 93.3673 | 4.795 | 1.83481 | 42.73 |
| 7 | −123.3006 | 1.500 | 1.80518 | 25.45 |
| 8 | −254.1381 | Variable | | |
| 9 | 40.5927 | 1.500 | 1.79504 | 28.69 |
| 10 | 25.0002 | 10.749 | 1.60300 | 65.44 |
| 11 | −105.9135 | Variable | | |
| 12(S) | ∞ | 2.540 | | |
| 13 | −52.6667 | 1.300 | 1.85026 | 32.35 |
| 14 | 33.3539 | 4.586 | | |
| 15 | 37.2026 | 1.300 | 1.74950 | 35.25 |
| 16 | 25.3810 | 5.571 | 1.80809 | 22.74 |
| 17 | −234.9670 | Variable | | |
| 18 | 62.4943 | 1.300 | 1.80518 | 25.45 |
| 19 | 18.1697 | 8.200 | 1.55332 | 71.68 |
| *20 | −42.1612 | Variable | | |
| *21 | −6257.4714 | 3.600 | 1.80301 | 25.53 |
| 22 | −49.3227 | 1.875 | | |
| 23 | −33.3339 | 1.200 | 1.72825 | 28.38 |
| 24 | 70.6726 | Variable | | |
| 25 | 47.6911 | 7.458 | 1.90200 | 25.26 |
| 26 | 110.0504 | BF | | |
| I | ∞ | | | |

[Aspherical Data]

m: 2

κ = 0.0000
A4 = 3.47464E−06
A6 = 2.06289E−09
A8 = −2.87066E−12
A10 = 6.84678E−15
A12 = −3.05130E−18 m: 3

κ = 1.0000
A4 = −3.34275E−07
A6 = −6.53686E−10
A8 = 1.41918E−12
A10 = −6.87012E−16 m: 20

κ = 1.0000
A4 = 3.21231E−06
A6 = −2.72101E−08
A8 = 1.74184E−10
A10 = −4.74606E−13 m: 21

κ = 1.0000
A4 = 4.04674E−06
A6 = −1.32981E−08
A8 = 1.27233E−10
A10 = −1.86784E−13

[Various Data]
Variable magnification ratio 2.99

| | W | M | T |
|---|---|---|---|
| f | 22.7 | 50.0 | 67.9 |
| FNO | 2.92 | 2.92 | 2.92 |
| 2ω | 90.12 | 47.98 | 35.62 |
| Ymax | 19.31 | 21.60 | 21.60 |
| TL | 199.49 | 166.47 | 170.49 |
| BF | 16.69 | 24.96 | 25.26 |

TABLE 2-continued

Second Example

| | W INF | M INF | T INF | W CLO | M CLO | T CLO |
|---|---|---|---|---|---|---|
| d5 | 64.992 | 11.651 | 2.111 | 64.992 | 11.651 | 2.111 |
| d8 | 7.938 | 1.000 | 1.000 | 7.938 | 1.000 | 1.000 |
| d11 | 2.500 | 9.805 | 17.785 | 2.500 | 9.805 | 17.785 |
| d17 | 8.103 | 6.811 | 2.000 | 8.103 | 6.811 | 2.000 |
| d20 | 2.000 | 4.908 | 2.763 | 2.924 | 6.260 | 4.220 |
| d24 | 12.267 | 22.329 | 34.572 | 11.343 | 20.977 | 33.114 |

[Lens Group Data]

| Group | ST | f |
|---|---|---|
| 1 | 1 | −43.850 |
| 2 | 6 | 81.660 |
| 3 | 9 | 58.238 |
| 4 | 12 | −95.001 |
| 5 | 18 | 81.887 |
| 6 | 21 | −66.376 |
| 7 | 25 | 88.300 |

[Values for Conditional Expressions]

| | |
|---|---|
| (1) | $|fF|/|fRL| = 0.800$ |
| (2) | $BFw/fw = 0.735$ |
| (3) | $|fF|/ft = 0.978$ |
| (4) | $f1N/f1 = 0.995$ |
| (5) | $D1Mw/fw = 2.863$ |
| (6) | $vM1P/vM1N = 2.281$ |
| (7) | $fM1P/fM1N = 0.405$ |
| (8) | $\omega w = 45.56°$ |

Figure 5A:
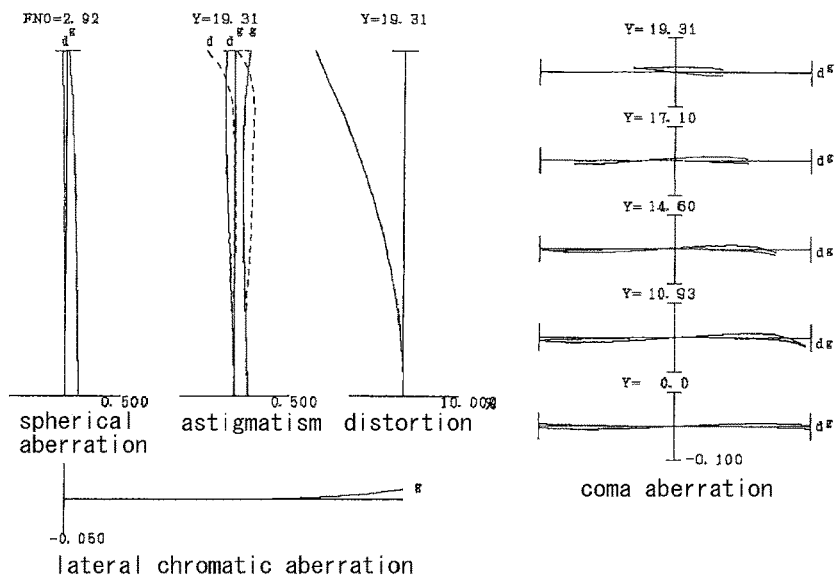
FIG. 5A, FIG. 5B and FIG. 5C are graphs showing various aberrations upon focusing on an infinite distance object, respectively, in the wide angle end state, in the intermediate focal length state, and in the telephoto end state, of the variable magnification optical system according to the Second Example.
Figure 5B:
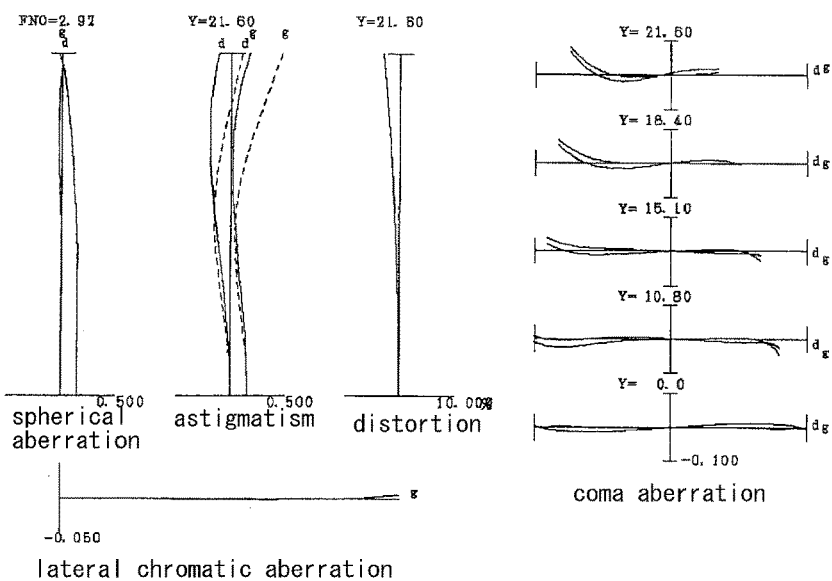
Figure 5C:
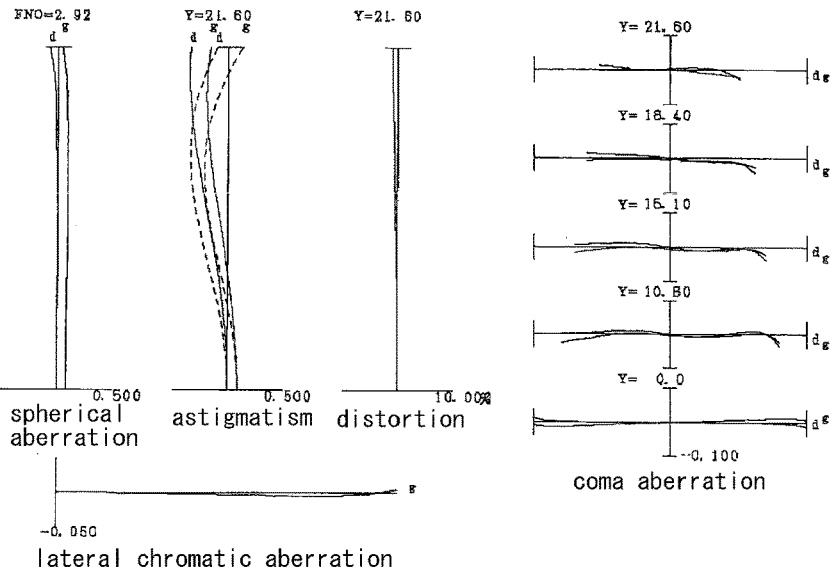

FIG. 5A, FIG. 5B and FIG. 5C are graphs showing various aberrations upon focusing on an infinite distance object, respectively, in the wide angle end state, in the intermediate focal length state and in the telephoto end state, of the variable magnification optical system according to the Second Example.

Figure 6A:
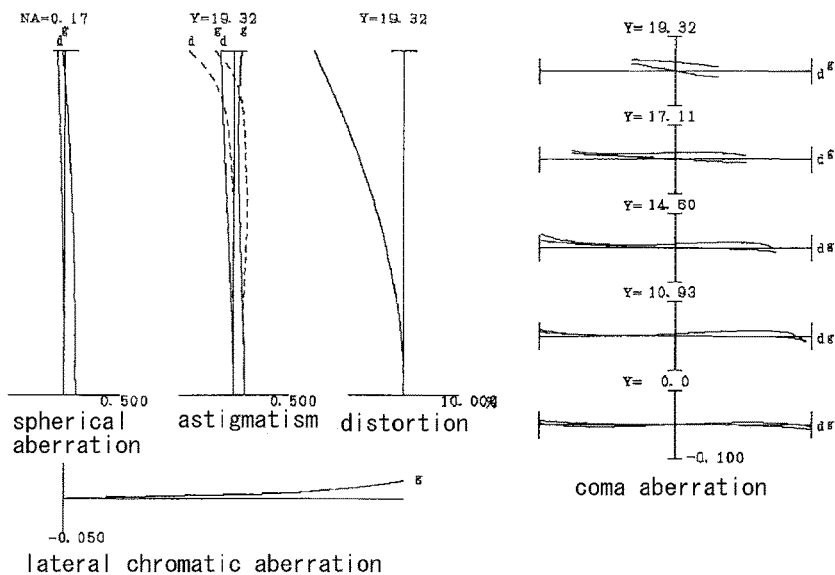
FIG. 6A, FIG. 6B and FIG. 6C are graphs showing various aberrations upon focusing on a close distance object, respectively, in the wide angle end state, in the intermediate focal length state, and in the telephoto end state, of the variable magnification optical system according to the Second Example.
Figure 6B:
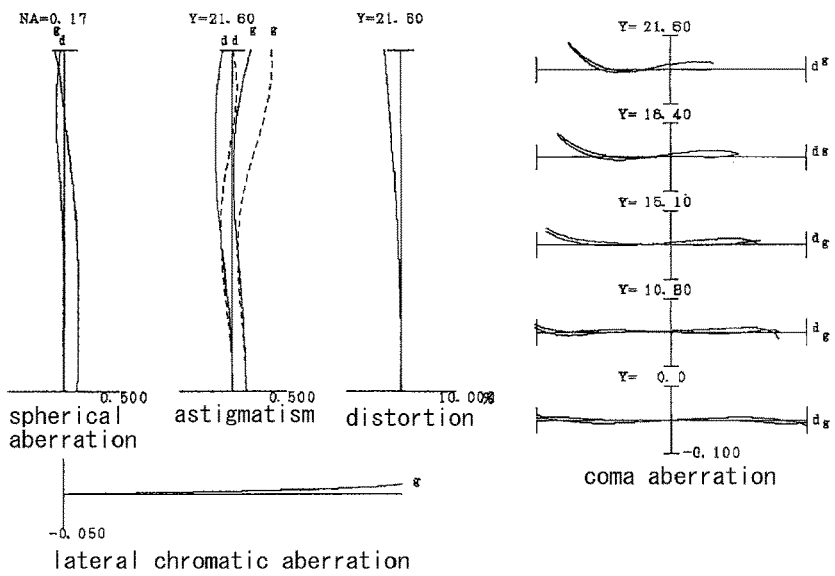
Figure 6C:
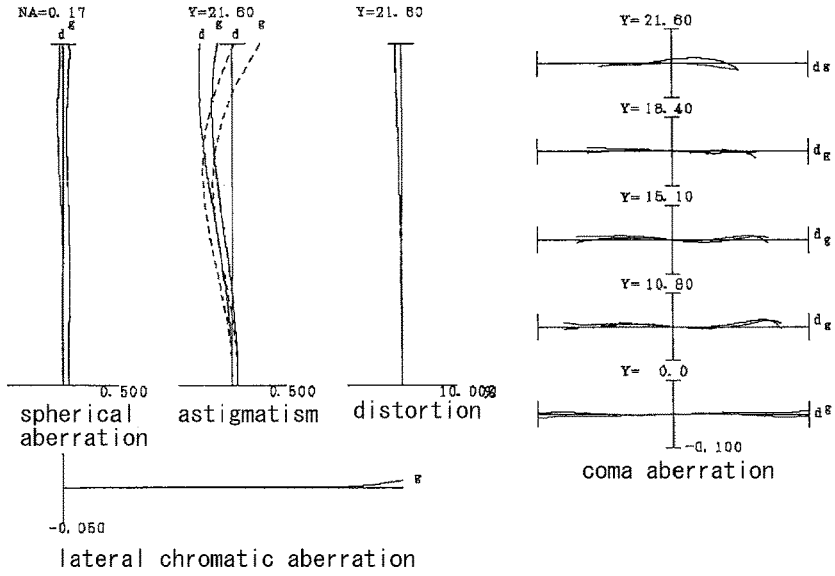

FIG. 6A, FIG. 6B and FIG. 6C are graphs showing various aberrations upon focusing on a close distance object, respectively, in the wide angle end state, in the intermediate focal length state and in the telephoto end state, of the variable magnification optical system according to the Second Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

Third Example

Figure 7:
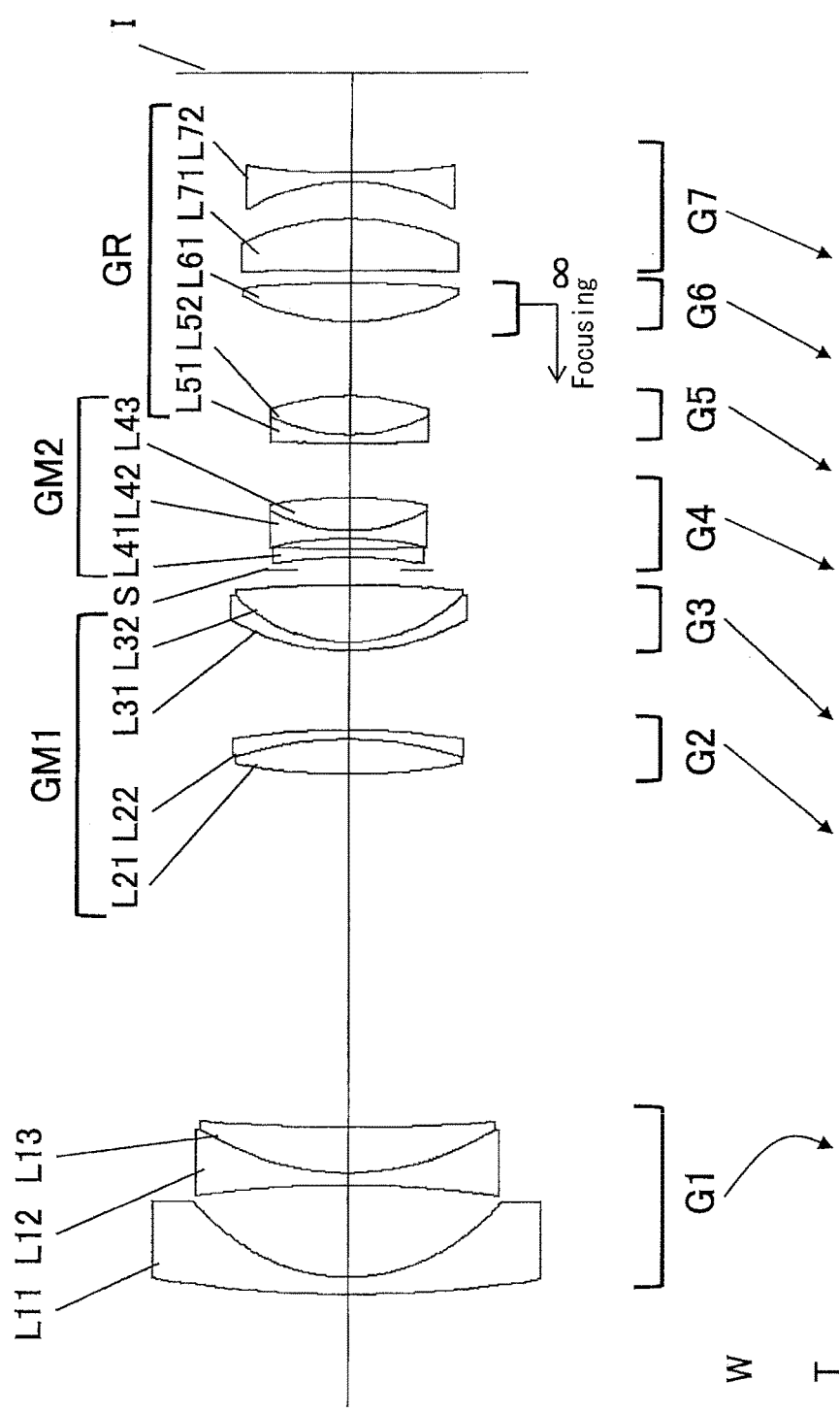
FIG. 7 is a sectional view of a variable magnification optical system according to a Third Example.

FIG. 7 is a sectional view of a variable magnification optical system according to a Third Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of, in order from the object side, a second lens group G2 having positive refractive power and a third lens group G3 having positive refractive power.

The second intermediate lens group GM2 is composed of a fourth lens group G4.

The rear lens group GR is composed of, in order from the object side, a fifth lens group G5 having positive refractive power, a sixth lens group G6 having positive refractive power, and a seventh lens group G7 having negative refractive power.

The first lens group G1 consists of, in order from the object side, a negative meniscus lens L11 having a convex surface facing the object side, and a cemented negative lens constructed by a double concave negative lens L12 cemented with a positive meniscus lens L13 having a convex surface facing the object side.

The second lens group G2 consists of a cemented positive lens constructed by a double convex positive lens L21 cemented with a negative meniscus lens L22 having a concave surface facing the object side.

The third lens group G3 consists of a cemented positive lens constructed by a negative meniscus lens L31 having a convex surface facing the object side cemented with a double convex positive lens L32.

The fourth lens group G4 consists of, in order from the object side, a double concave negative lens L41 and a cemented negative lens constructed by a double concave negative lens L42 cemented with a double convex positive lens L43.

The fifth lens group G5 consists of a cemented positive lens constructed by a negative meniscus lens L51 having a convex surface facing the object side cemented with a double convex positive lens L52.

The sixth lens group G6 consists of a double convex positive lens L61.

The seventh lens group G7 is composed of, in order from the object side, a positive meniscus lens L71 having a concave surface facing the object side and a double concave negative lens L72.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving the sixth lens group G6 along the optical axis toward the object as focusing lens group.

Table 3 below shows various values of the variable magnification optical system relating to the present Example.

TABLE 3

Third Example

[Surface Data]

| m | r | d | nd | vd |
|---|---|---|---|---|
| OP | ∞ | | | |
| 1 | 200.0000 | 2.900 | 1.74389 | 49.53 |
| *2 | 29.9416 | 15.494 | | |
| *3 | −200.8674 | 2.100 | 1.69343 | 53.30 |
| 4 | 44.6733 | 7.746 | 1.85000 | 27.03 |
| 5 | 318.4789 | Variable | | |
| 6 | 108.1956 | 5.825 | 1.80400 | 46.60 |
| 7 | −62.4397 | 1.500 | 1.84666 | 23.80 |
| 8 | −135.1571 | Variable | | |
| 9 | 39.6194 | 1.500 | 1.84666 | 23.80 |
| 10 | 27.1969 | 9.538 | 1.60300 | 65.44 |
| 11 | −223.7185 | Variable | | |
| 12(S) | ∞ | 2.115 | | |
| 13 | −77.7324 | 1.300 | 1.83481 | 42.73 |
| 14 | 186.4173 | 1.924 | | |
| 15 | −51.8167 | 1.300 | 1.80100 | 34.92 |
| 16 | 27.4630 | 5.440 | 1.80809 | 22.74 |
| 17 | −78.0293 | Variable | | |
| 18 | 273.2433 | 1.500 | 1.95000 | 29.37 |
| 19 | 29.6710 | 6.516 | 1.59319 | 67.90 |
| 20 | −41.4738 | Variable | | |
| 21 | 39.0977 | 6.500 | 1.48749 | 70.31 |
| 22 | −208.2456 | Variable | | |
| *23 | −736.4795 | 8.500 | 1.55332 | 71.67 |
| 24 | −42.9142 | 6.153 | | |
| 25 | −34.6367 | 1.500 | 1.67798 | 54.89 |
| *26 | 147.0962 | BF | | |
| I | ∞ | | | |

[Aspherical Data]

m: 2

κ = 0.0000
A4 = 2.64488E−06
A6 = 7.93387E−10
A8 = −2.18796E−13
A10 = 2.18394E−15
A12 = −6.34900E−19 m: 3

κ = 1.0000
A4 = −2.63676E−07
A6 = −4.45738E−10
A8 = 9.61010E−13
A10 = −3.72624E−16 m: 23

κ = 1.0000
A4 = −2.62769E−07
A6 = 7.24281E−10
A8 = −9.63646E−13
A10 = −6.01683E−15 m: 26

κ = 1.0000
A4 = 5.86678E−07
A6 = 1.11104E−09
A8 = 1.08716E−11
A10 = −2.05060E−14

[Various Data]
Variable magnification ratio 2.99

| | W | M | T |
|---|---|---|---|
| f | 22.7 | 50.0 | 67.9 |
| FNO | 2.92 | 2.92 | 2.92 |
| 2ω | 90.26 | 47.38 | 35.28 |
| Ymax | 19.64 | 21.60 | 21.60 |
| TL | 204.49 | 174.12 | 175.49 |
| BF | 16.69 | 28.18 | 36.33 |

TABLE 3-continued

Third Example

| | W INF | M INF | T INF | W CLO | M CLO | T CLO |
|---|---|---|---|---|---|---|
| d5 | 59.091 | 10.830 | 2.000 | 59.091 | 10.830 | 2.000 |
| d8 | 13.328 | 1.000 | 1.000 | 13.328 | 1.000 | 1.000 |
| d11 | 2.500 | 14.191 | 22.877 | 2.500 | 14.191 | 22.877 |
| d17 | 9.032 | 7.248 | 2.000 | 9.032 | 7.248 | 2.000 |
| d20 | 12.353 | 19.355 | 19.924 | 11.550 | 18.113 | 18.492 |
| d22 | 2.147 | 3.969 | 2.006 | 2.949 | 5.211 | 3.438 |

[Lens Group Data]

| Group | ST | f |
|---|---|---|
| 1 | 1 | −40.605 |
| 2 | 6 | 77.859 |
| 3 | 9 | 66.608 |
| 4 | 12 | −52.441 |
| 5 | 18 | 160.100 |
| 6 | 21 | 68.111 |
| 7 | 23 | −97.113 |

[Values for Conditional Expressions]

| (1) | |fF|/|fRL| = 1.653 |
|---|---|
| (2) | BFw/fw = 0.735 |
| (3) | |fF|/ft = 1.003 |
| (4) | f1N/f1 = 1.174 |
| (5) | D1Mw/fw = 2.603 |
| (6) | νM1P/νM1N = 2.750 |
| (7) | fM1P/fM1N = 0.376 |
| (8) | ωw = 45.13° |

Figure 8A:
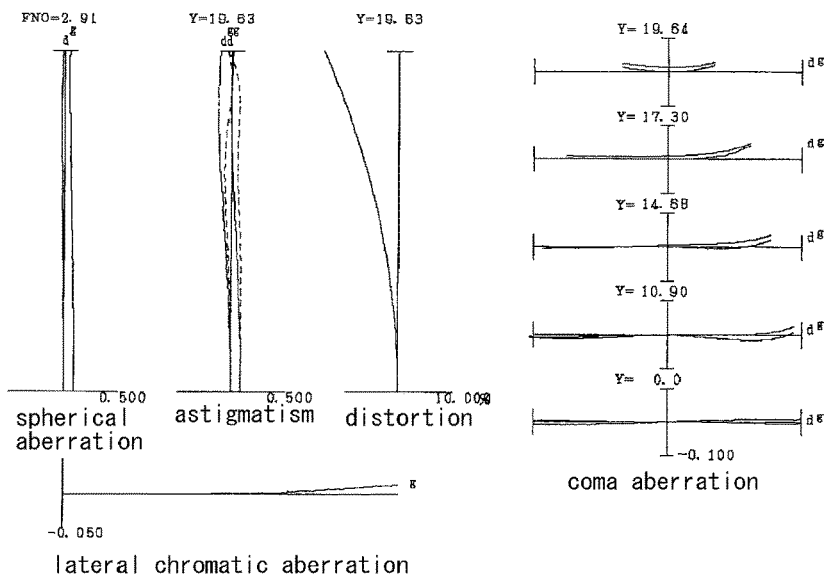
FIG. 8A, FIG. 8B and FIG. 8C are graphs showing various aberrations upon focusing on an infinite distance object, respectively, in the wide angle end state, in the intermediate focal length state, and in the telephoto end state, of the variable magnification optical system according to the Third Example.
Figure 8B:
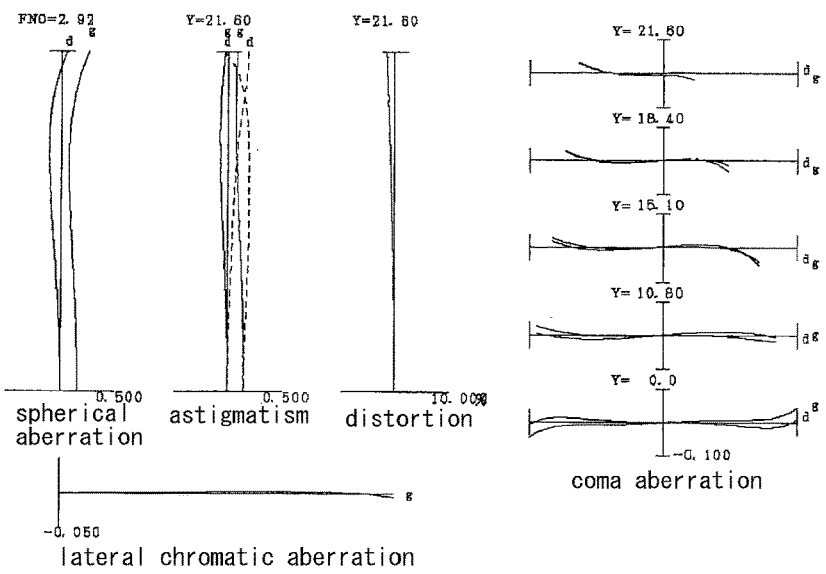
Figure 8C:
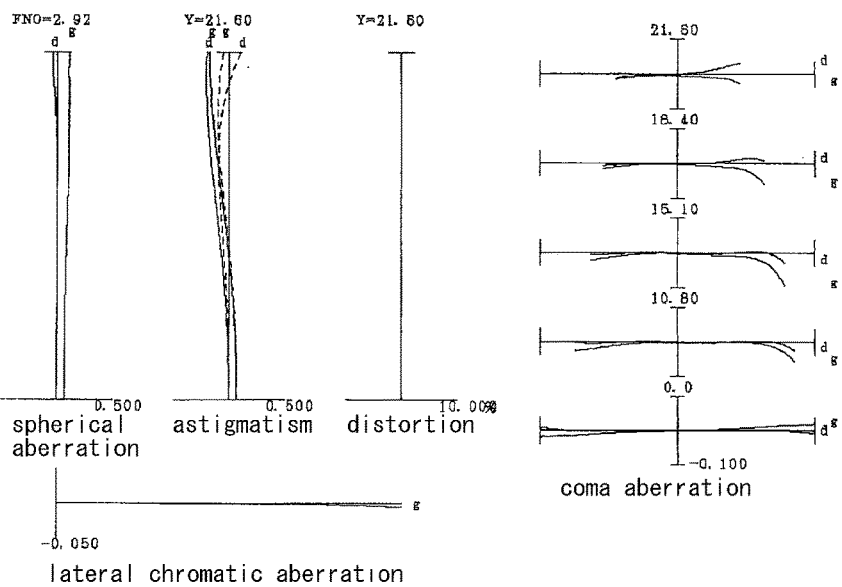

FIG. 8A, FIG. 8B and FIG. 8C are graphs showing various aberrations upon focusing on an infinite distance object, respectively, in the wide angle end state, in the intermediate focal length state and in the telephoto end state, of the variable magnification optical system according to the Third Example.

Figure 9A:
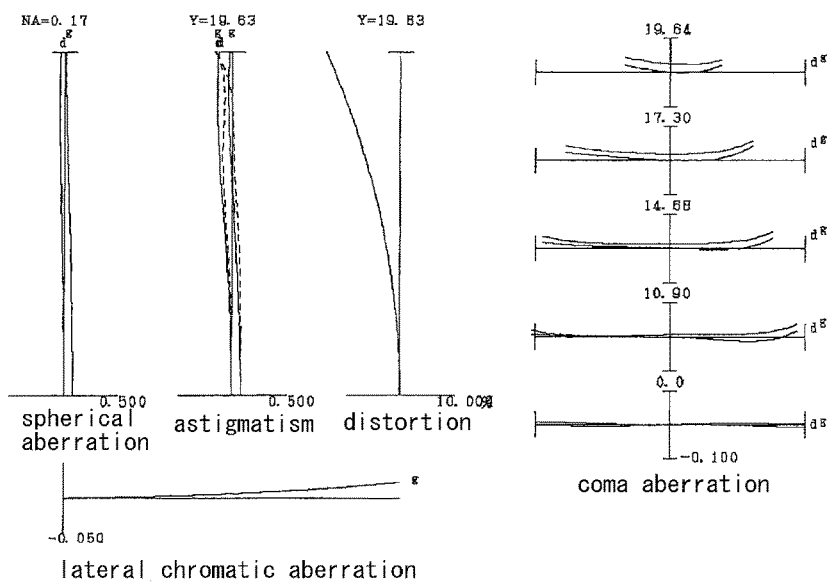
FIG. 9A, FIG. 9B and FIG. 9C are graphs showing various aberrations upon focusing on a close distance object, respectively, in the wide angle end state, in the intermediate focal length state, and in the telephoto end state, of the variable magnification optical system according to the Third Example.
Figure 9B:
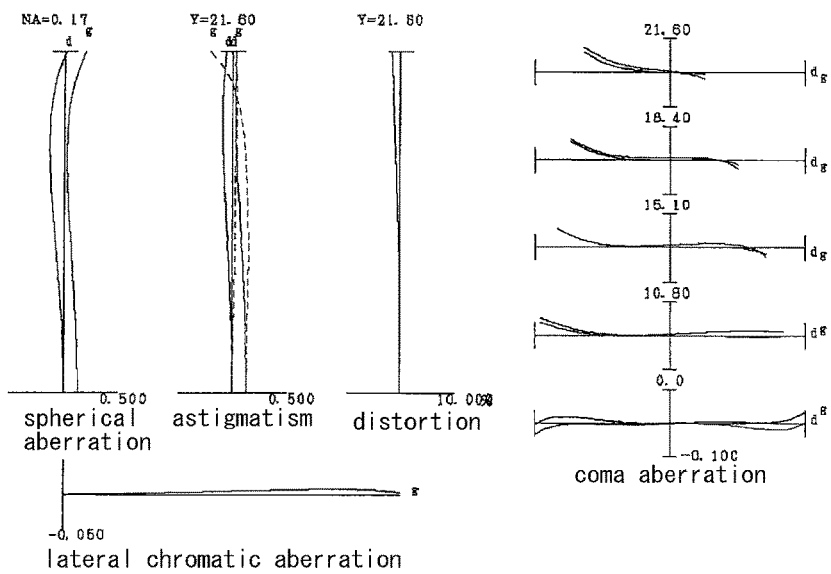
Figure 9C:
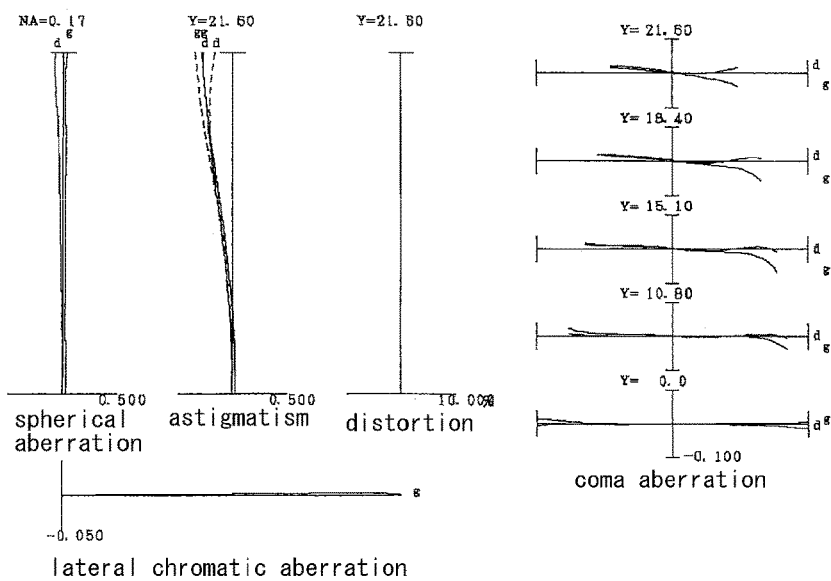

FIGS. 9A, 9B and 9C are graphs showing various aberrations upon focusing on a close distance object, respectively, in the wide angle end state, in the intermediate focal length state and in the telephoto end state, of the variable magnification optical system according to the Third Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

Fourth Example

Figure 10:
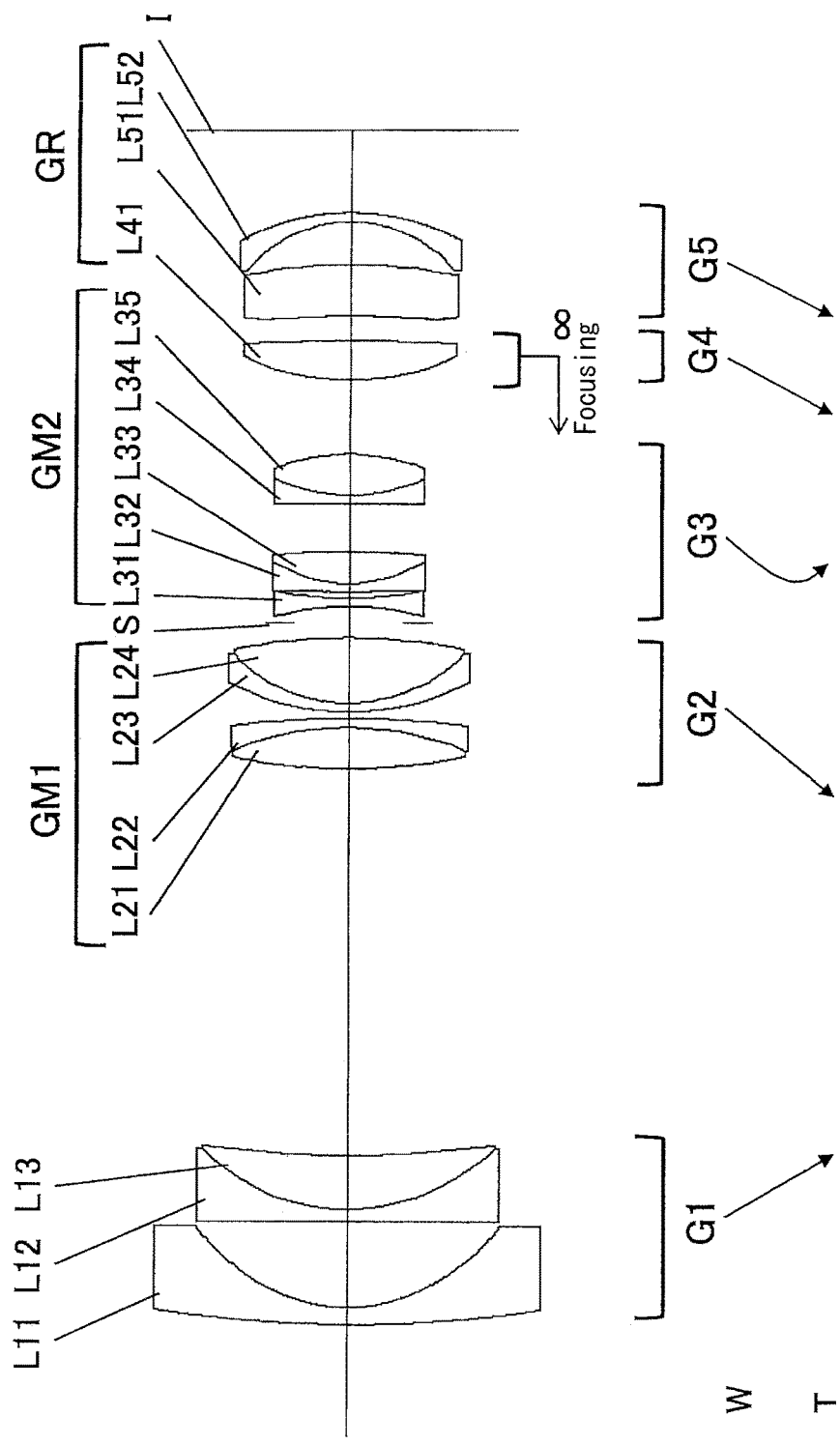
FIG. 10 is a sectional view of a variable magnification optical system according to a Fourth Example.

FIG. 10 is a sectional view of a variable magnification optical system according to a Fourth Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of a second lens group G2 having positive refractive power.

The second intermediate lens group GM2 is composed of a third lens group G3.

The rear lens group GR is composed of, in order from the object side, a fourth lens group G4 having positive refractive power and a fifth lens group G5 having negative refractive power.

The first lens group G1 consists of, in order from the object side, a negative meniscus lens L11 having a convex surface facing the object side, and a cemented positive lens constructed by a negative meniscus lens L12 having a convex surface facing the object side cemented with a positive meniscus lens L13 having a convex surface facing the object side.

The second lens group G2 consists of, in order from the object side, a cemented positive lens constructed by a double convex positive lens L21 cemented with a negative meniscus lens L22 having a concave surface facing the object side, and a cemented positive lens constructed by a negative meniscus lens L23 having a convex surface facing the object side cemented with a double convex positive lens L24.

The third lens group G3 consists of, in order from the object side, a double concave negative lens L31, a cemented positive lens constructed by a negative meniscus lens L32 having a convex surface facing the object side cemented with a double convex positive lens L33, and a cemented positive lens constructed by a negative meniscus lens L34 having a convex surface facing the object side cemented with a double convex positive lens L35.

The fourth lens group G4 consists of a double convex positive lens L41.

The fifth lens group G5 consists of, in order from the object side, a positive meniscus lens L51 having a concave surface facing the object side and a negative meniscus lens L52 having a concave surface facing the object side.

In the variable magnification optical system according to the present Example, upon varying magnification between the wide angle end state and the telephoto end state, all lens groups of the first lens group G1 to the fifth lens group G5 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5, are varied.

In the variable magnification optical system according to the present Example, focusing from an infinite distance object to a close distance object is carried out by moving the fourth lens group G4 toward the object as a focusing lens group.

Table 4 below shows various values of the variable magnification optical system relating to the present Example.

TABLE 4

Fourth Example

[Surface Data]

| m | r | d | nd | vd |
|---|---|---|---|---|
| OP | ∞ | | | |
| 1 | 200.0000 | 2.900 | 1.74389 | 49.53 |
| *2 | 27.7802 | 14.448 | | |
| *3 | 1296.6773 | 2.100 | 1.69343 | 53.30 |
| 4 | 34.8575 | 9.043 | 1.85000 | 27.03 |
| 5 | 174.0595 | Variable | | |
| 6 | 96.7860 | 6.874 | 1.80400 | 46.60 |
| 7 | −52.4305 | 1.500 | 1.84666 | 23.80 |
| 8 | −177.3376 | 1.000 | | |
| 9 | 43.5282 | 1.500 | 1.84666 | 23.80 |
| 10 | 26.9388 | 11.032 | 1.59319 | 67.90 |
| 11 | −99.1173 | Variable | | |
| 12(S) | ∞ | 2.808 | | |
| 13 | −44.3650 | 1.300 | 1.80400 | 46.60 |
| 14 | 71.1308 | 1.016 | | |
| 15 | 416.3908 | 1.300 | 1.71999 | 50.27 |
| 16 | 23.6979 | 5.430 | 1.80809 | 22.74 |
| 17 | −136.8595 | 7.916 | | |
| 18 | 2542.1309 | 1.500 | 1.90200 | 25.26 |
| 19 | 30.4377 | 6.844 | 1.59319 | 67.90 |
| 20 | −35.3418 | Variable | | |
| 21 | 43.9437 | 6.500 | 1.48749 | 70.32 |
| 22 | −380.1806 | Variable | | |
| *23 | −107.1075 | 8.500 | 1.55332 | 71.68 |
| 24 | −86.8745 | 7.112 | | |
| 25 | −22.8630 | 1.500 | 1.67798 | 54.89 |
| *26 | −40.7153 | BF | | |
| I | ∞ | | | |

[Aspherical Data]

m: 2

κ = 0.0000
A4 = 3.03915E−06
A6 = 2.46295E−09
A8 = −2.53532E−12
A10 = 3.74583E−15
A12 = −6.34900E−19 m: 3

κ = 1.0000
A4 = −2.78528E−07
A6 = −3.14446E−10
A8 = 3.58529E−13
A10 = −1.27209E−16 m: 23

κ = 1.0000
A4 = 6.52833E−06
A6 = 1.33655E−08
A8 = −7.01957E−12
A10 = 5.45626E−14 m: 26

κ = 1.0000
A4 = −2.26773E−06
A6 = −1.49552E−09
A8 = 2.69475E−11
A10 = −3.21917E−14

[Various Data]
Variable magnification ratio 2.99

| | W | M | T |
|---|---|---|---|
| f | 22.7 | 50.0 | 67.9 |
| FNO | 2.92 | 2.92 | 2.92 |
| 2ω | 90.80 | 48.02 | 35.28 |
| Ymax | 19.27 | 21.60 | 21.60 |
| TL | 199.61 | 181.30 | 175.49 |
| BF | 13.71 | 19.42 | 30.99 |

| | W INF | M INF | T INF | W CLO | M CLO | T CLO |
|---|---|---|---|---|---|---|
| d5 | 64.761 | 16.002 | 3.958 | 64.761 | 16.002 | 3.958 |
| d11 | 2.500 | 10.994 | 21.579 | 2.500 | 10.994 | 21.579 |
| d20 | 12.355 | 28.806 | 14.836 | 11.534 | 27.309 | 13.300 |
| d22 | 4.172 | 3.955 | 2.000 | 4.993 | 5.453 | 3.536 |

[Lens Group Data]

| Group | ST | f |
|---|---|---|
| 1 | 1 | −43.293 |
| 2 | 6 | 37.710 |
| 3 | 12 | −166.903 |

TABLE 4-continued

Fourth Example

| 4 | 21 | 81.211 |
|---|---|---|
| 5 | 23 | −87.491 |

[Values for Conditional Expressions]

| (1) | |fF|/|fRL| = 1.020 |
|---|---|
| (2) | BFw/fw = 0.604 |
| (3) | |fF|/ft = 1.196 |
| (4) | f1N/f1 = 1.009 |
| (5) | D1Mw/fw = 2.853 |
| (6) | νM1P/νM1N = 2.853 |
| (7) | fM1P/fM1N = 0.424 |
| (8) | ωw = 45.40° |

Figure 11A:
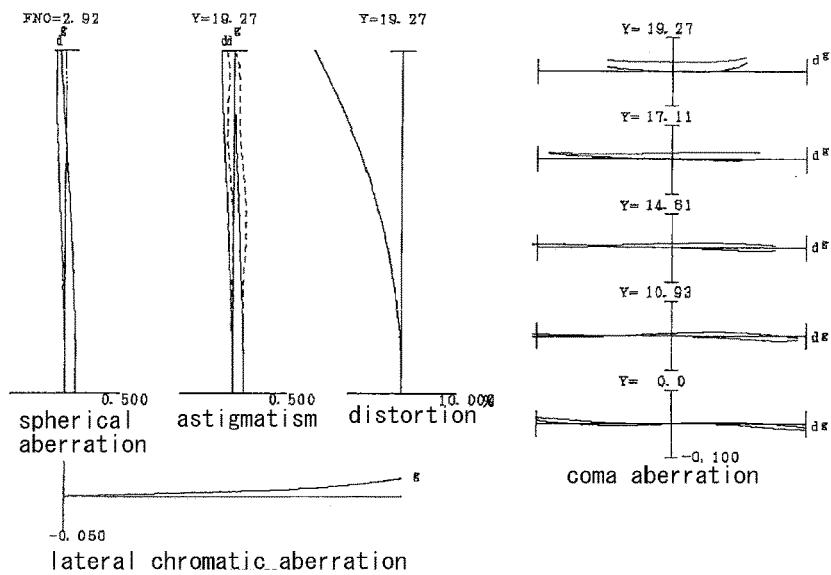
FIG. 11A, FIG. 11B and FIG. 11C are graphs showing various aberrations upon focusing on an infinite distance object, respectively, in the wide angle end state, in the intermediate focal length state, and in the telephoto end state, of the variable magnification optical system according to the Fourth Example.
Figure 11B:
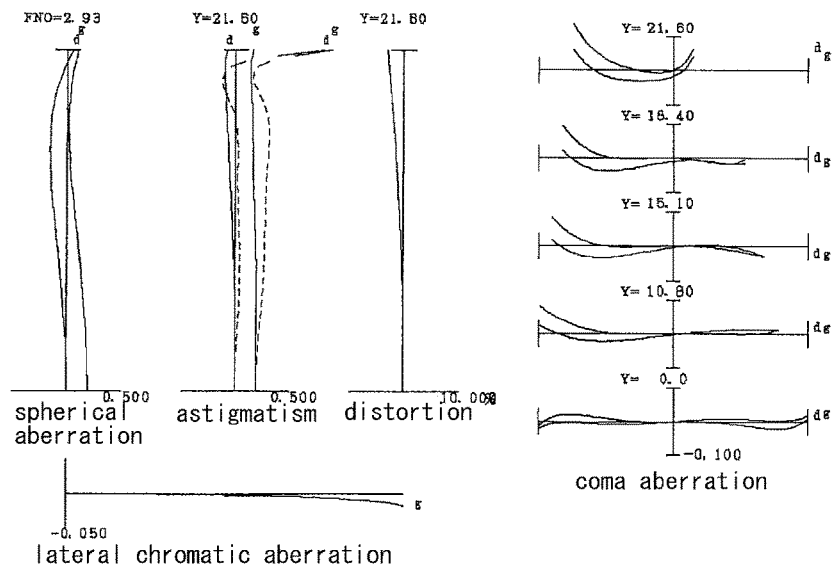
Figure 11C:
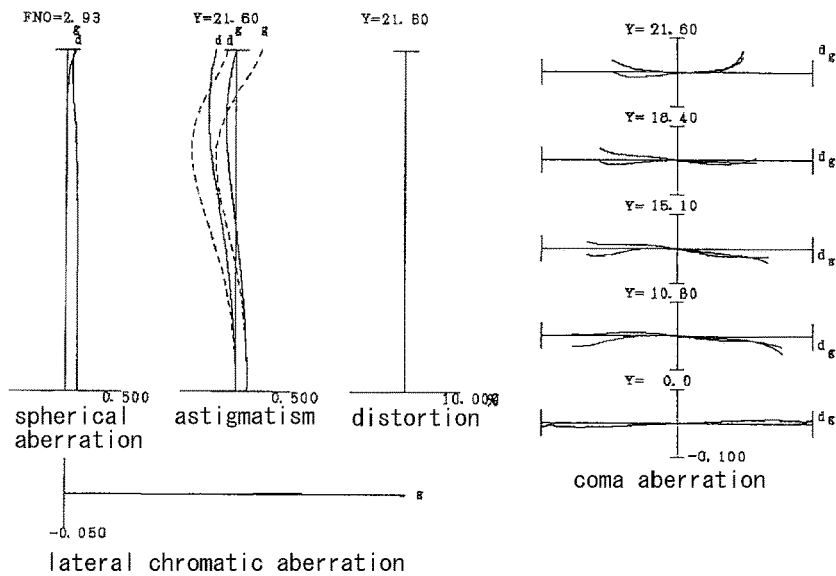

FIG. 11A, FIG. 11B and FIG. 11C are graphs showing various aberrations upon focusing on an infinite distance object, respectively, in the wide angle end state, in the intermediate focal length state and in the telephoto end state, of the variable magnification optical system according to the Fourth Example.

Figure 12A:
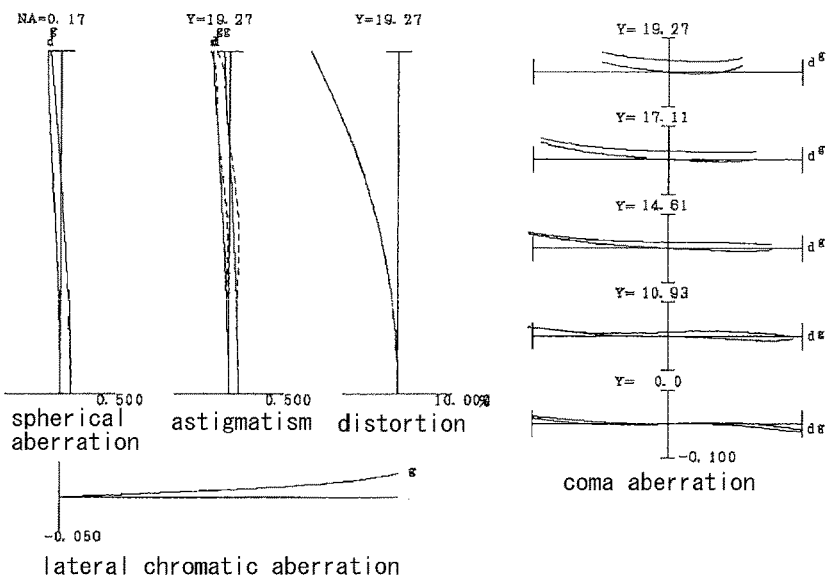
FIGS. 12A, 12B and 12C are graphs showing various aberrations upon focusing on a close distance object, respectively, in the wide angle end state, in the intermediate focal length state, and in the telephoto end state, of the variable magnification optical system according to the Fourth Example.
Figure 12B:
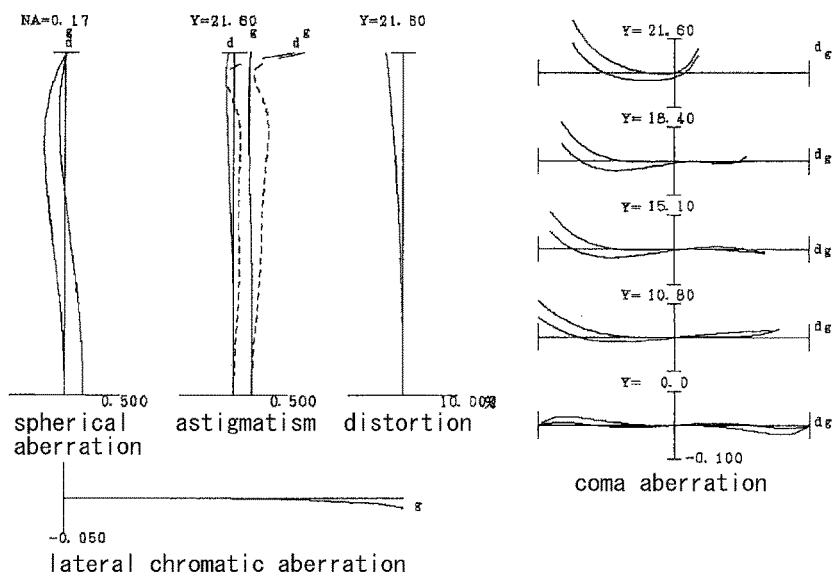
Figure 12C:
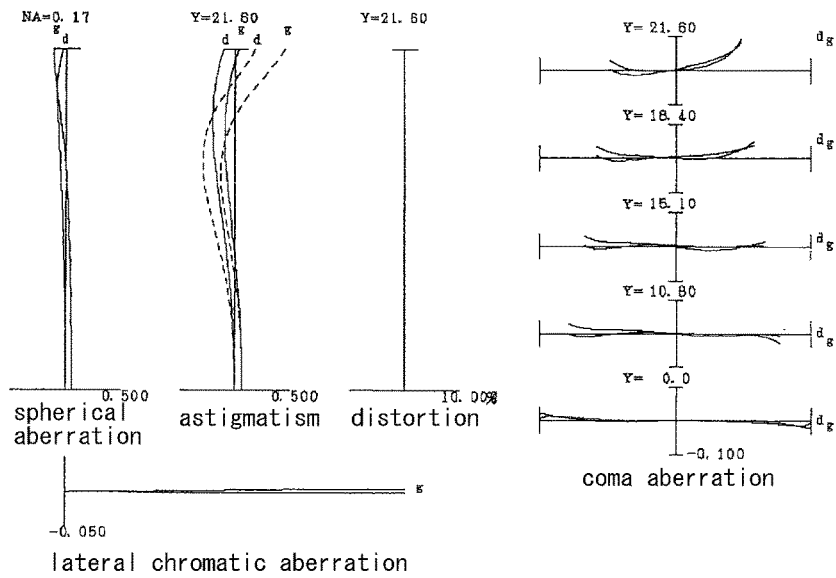

FIG. 12A, FIG. 12B and FIG. 12C are graphs showing various aberrations upon focusing on a close distance object, respectively, in the wide angle end state, in the intermediate focal length state and in the telephoto end state, of the variable magnification optical system according to the Fourth Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

Fifth Example

Figure 13:
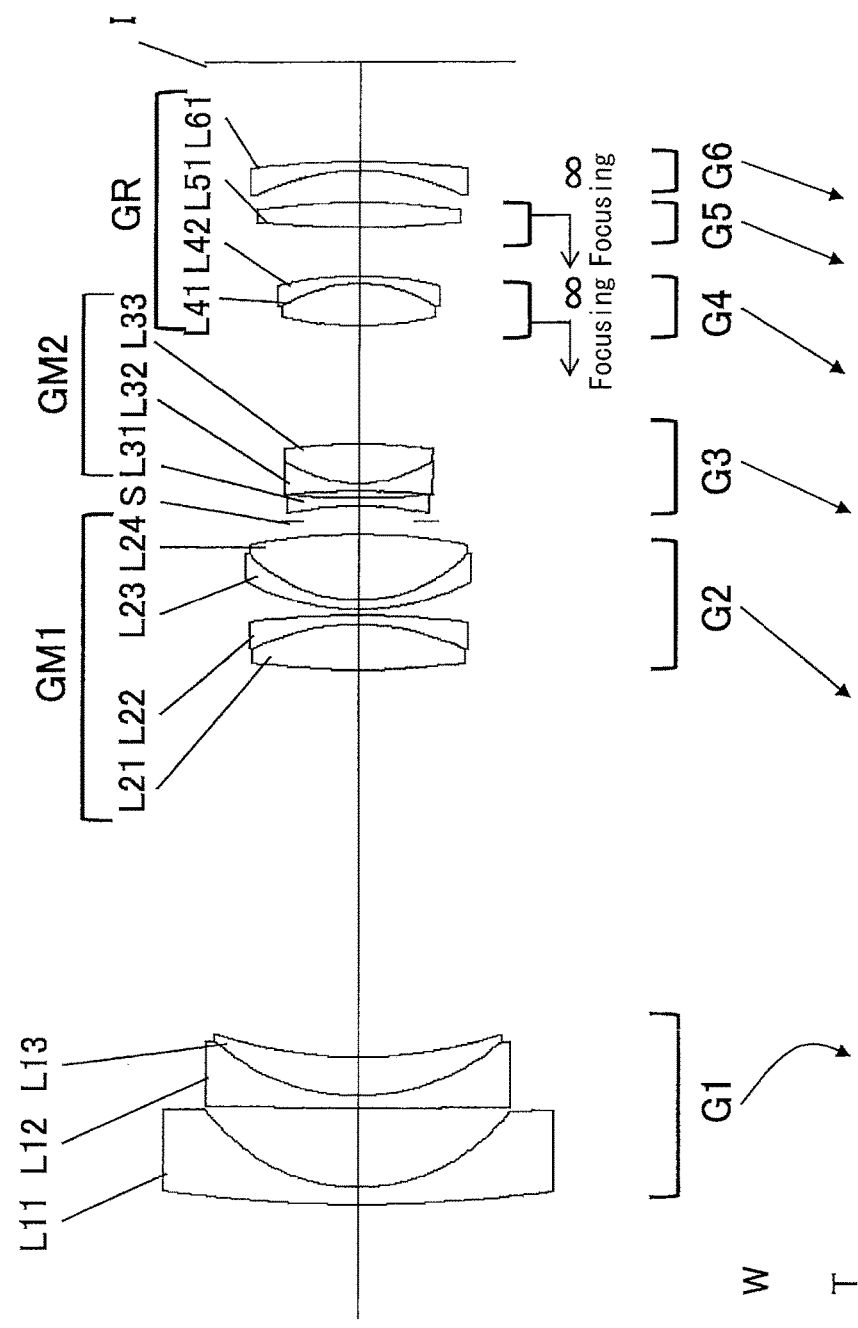
FIG. 13 is a sectional view of a variable magnification optical system according to a Fifth Example.

FIG. 13 is a sectional view of a variable magnification optical system according to a Fifth Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of a second lens group G2 having positive refractive power.

The second intermediate lens group GM2 is composed of a third lens group G3.

The rear lens group GR is composed of, in order from the object side, a fourth lens group G4 having positive refractive power, a fifth lens group G5 having positive refractive power and a sixth lens group G6 having negative refractive power.

The first lens group G1 consists of, in order from the object side, a negative meniscus lens L11 having a convex surface facing the object side, and a cemented negative lens constructed by a negative meniscus lens L12 having a convex surface facing the object side cemented with a positive meniscus lens L13 having a convex surface facing the object side.

The second lens group G2 consists of, in order from the object side, a cemented positive lens constructed by a double convex positive lens L21 cemented with a negative meniscus lens L22 having a concave surface facing the object side, and a cemented positive lens constructed by a negative meniscus lens L23 having a convex surface facing the object side cemented with a double convex positive lens L24.

The third lens group G3 consists of, in order from the object side, a double concave negative lens L31, and a cemented positive lens constructed by a double concave negative lens L32 cemented with a double convex positive lens L33.

The fourth lens group G4 consists of a cemented positive lens constructed by a double convex positive lens L41 cemented with a negative meniscus lens L42 having a concave surface facing the object side.

The fifth lens group G5 consists of a double convex positive lens L51.

The sixth lens group G6 consists of a negative meniscus lens L61 having a concave surface facing the object side.

In the variable magnification optical system according to the present Example, upon varying magnification between the wide angle end state and the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied.

In the variable magnification optical system according to the present Example, focusing from an infinite distance object to a close distance object is carried out by moving the fourth lens group G4 and the fifth lens group G5 independently toward the object as respective focusing lens groups.

Table 5 below shows various values of the variable magnification optical system relating to the present Example.

TABLE 5

Fifth Example

[Surface Data]
[Surface Data]

| m | r | d | nd | vd |
|---|---|---|---|---|
| OP | ∞ | | | |
| 1 | 217.2239 | 2.900 | 1.74389 | 49.53 |
| *2 | 30.2414 | 13.112 | | |
| 3 | 1223.5572 | 2.100 | 1.59349 | 67.00 |
| 4 | 35.8181 | 6.436 | 2.00069 | 25.46 |
| 5 | 72.5839 | Variable | | |
| 6 | 128.9112 | 7.447 | 1.81600 | 46.59 |
| 7 | −39.6982 | 1.500 | 1.85000 | 27.03 |
| 8 | −142.9408 | 1.000 | | |
| 9 | 40.8283 | 1.500 | 1.80518 | 25.45 |
| 10 | 25.0719 | 10.948 | 1.60300 | 65.44 |
| 11 | −92.3055 | Variable | | |
| 12(S) | ∞ | 2.486 | | |
| 13 | −55.5201 | 1.300 | 1.90265 | 35.72 |
| 14 | 121.6217 | 1.190 | | |
| 15 | −124.4061 | 1.300 | 1.67270 | 32.18 |
| 16 | 22.4038 | 6.400 | 1.80809 | 22.74 |
| 17 | −97.2368 | Variable | | |
| 18 | 62.1388 | 6.900 | 1.48749 | 70.32 |
| 19 | −23.2151 | 1.300 | 1.78472 | 25.64 |
| 20 | −50.9732 | Variable | | |
| 21 | 186.2633 | 4.200 | 1.58913 | 61.15 |
| *22 | −79.5614 | Variable | | |
| *23 | −33.8149 | 1.500 | 1.58913 | 61.15 |
| 24 | −131.2649 | BF | | |
| I | ∞ | | | |

TABLE 5-continued

Fifth Example

[Aspherical Surface Data]

m: 2

κ = 0.0000
A4 = 3.46899E−06
A6 = 3.81982E−09
A8 = −6.40834E−12
A10 = 1.09738E−14
A12 = −4.82160E−18 m: 22

κ = 1.0000
A4 = 6.88818E−06
A6 = −6.09818E−10
A8 = 8.44660E−12
A10 = −2.63571E−14 m: 23

κ = 1.0000
A4 = 8.06346E−06
A6 = −8.60497E−09
A8 = 2.28581E−11
A10 = −5.12367E−14

[Various Data]
Variable magnification ratio 2.99

|     | W     | M     | T     |
| --- | ----- | ----- | ----- |
| f   | 22.7  | 50.0  | 67.9  |
| FNO | 2.92  | 2.92  | 2.92  |
| 2ω  | 91.24 | 45.92 | 33.78 |
| Ymax| 19.34 | 21.60 | 21.60 |
| TL  | 188.49| 155.49| 159.75|
| BF  | 16.19 | 19.69 | 24.21 |

|     | W INF | M INF | T INF | W CLO | M CLO | T CLO |
| --- | ----- | ----- | ----- | ----- | ----- | ----- |
| d5  | 63.857| 10.035| 2.501 | 63.857| 10.035| 2.501 |
| d11 | 2.202 | 10.972| 22.702| 2.202 | 10.972| 22.702|
| d17 | 19.524| 10.852| 10.688| 19.122| 9.959 | 9.322 |
| d20 | 8.007 | 19.445| 19.346| 7.507 | 19.082| 19.339|
| d22 | 5.193 | 10.974| 6.787 | 6.095 | 12.231| 8.161 |

[Lens Group Data]

| Group | ST | f       |
| ----- | -- | ------- |
| 1     | 1  | −42.007 |
| 2     | 6  | 36.073  |
| 3     | 12 | −74.292 |
| 4     | 18 | 96.221  |
| 5     | 21 | 95.186  |
| 6     | 23 | −77.759 |

[Values for Conditional Expressions]

(1) |fF|/|fRL| = 1.224
(2) BFw/fw = 0.713
(3) |fF|/ft = 1.402
(4) f1N/f1 = 1.132
(5) D1Mw/fw = 2.813
(6) νM1P/νM1N = 2.421
(7) fM1P/fM1N = 0.521
(8) ωw = 45.62°

Figure 14A:
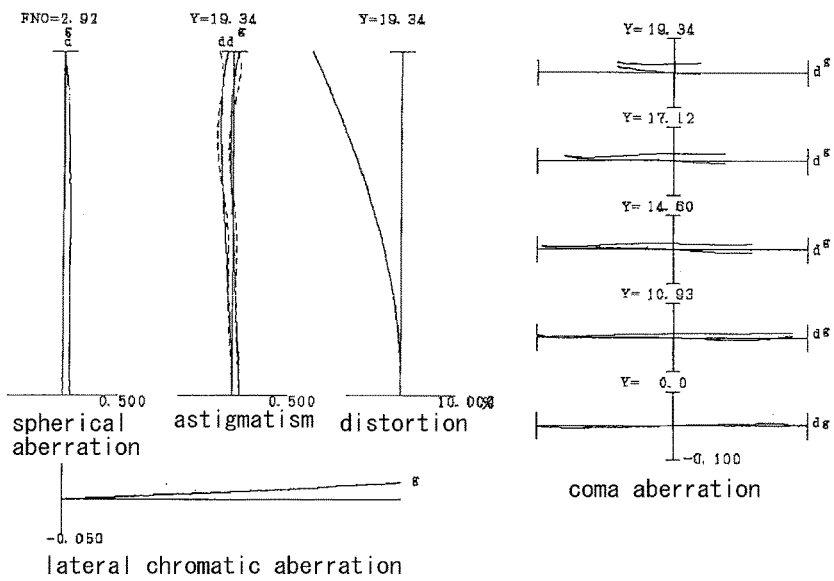
FIG. 14A, FIG. 14B and FIG. 14C are graphs showing various aberrations upon focusing on an infinite distance object, respectively, in the wide angle end state, in the intermediate focal length state, and in the telephoto end state, of the variable magnification optical system according to the Fifth Example.
Figure 14B:
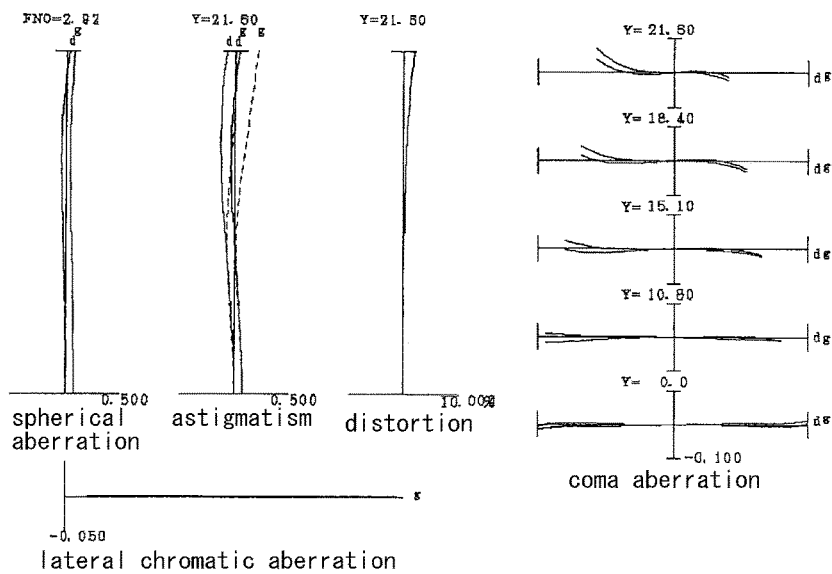
Figure 14C:
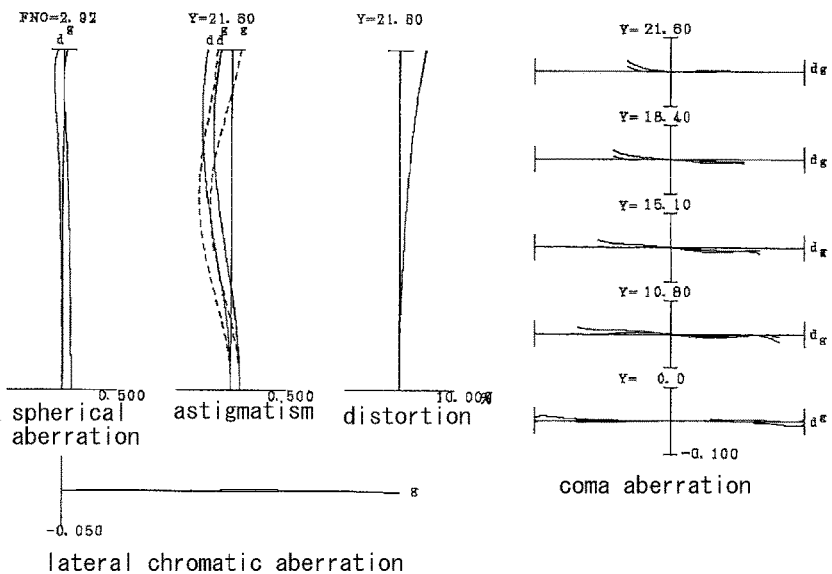

FIG. 14A, FIG. 14B and FIG. 14C are graphs showing various aberrations upon focusing on an infinite distance object, respectively, in the wide angle end state, in the intermediate focal length state and in the telephoto end state, of the variable magnification optical system according to the Fifth Example.

Figure 15A:
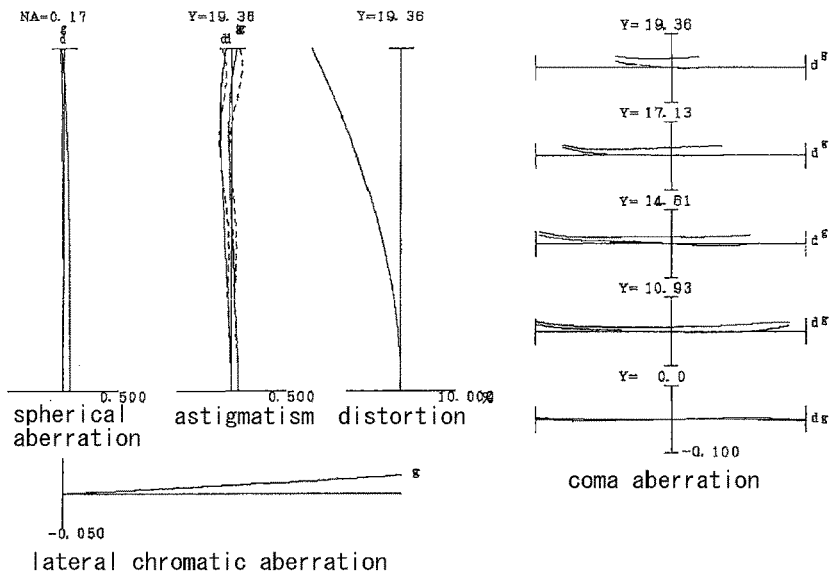
FIG. 15A, FIG. 15B and FIG. 15C are graphs showing various aberrations upon focusing on a close distance object, respectively, in the wide angle end state, in the intermediate focal length state, and in the telephoto end state, of the variable magnification optical system according to the Fifth Example.
Figure 15B:
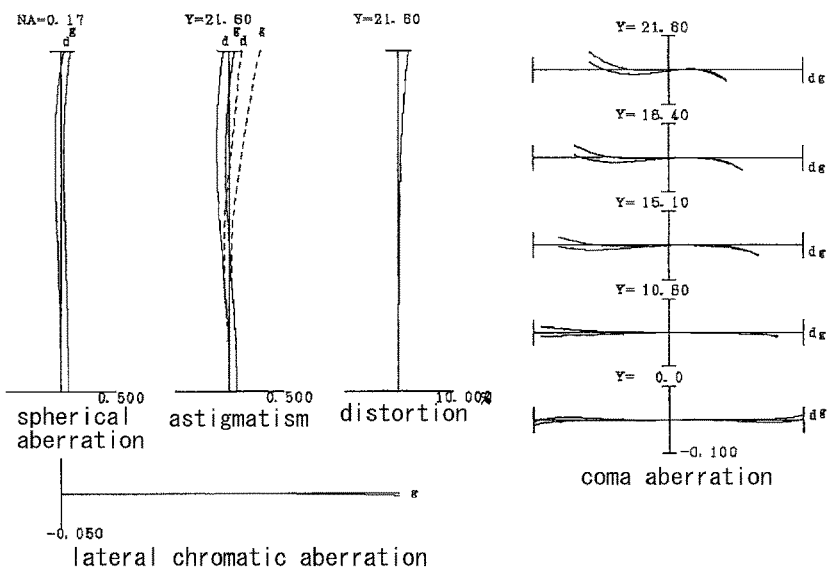
Figure 15C:
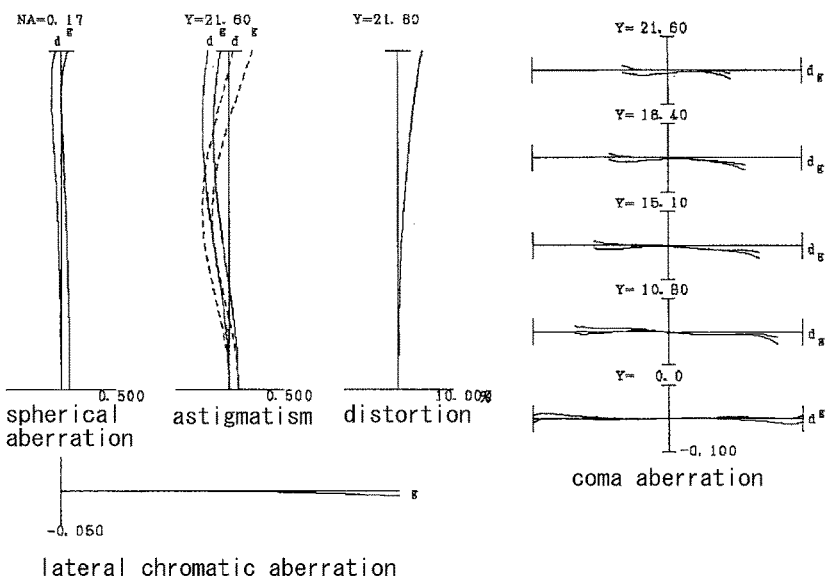

FIG. 15A, FIG. 15B and FIG. 15C are graphs showing various aberrations upon focusing on a close distance object, respectively, in the wide angle end state, in the intermediate focal length state and in the telephoto end state, of the variable magnification optical system according to the Fifth Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

Sixth Example

Figure 16:
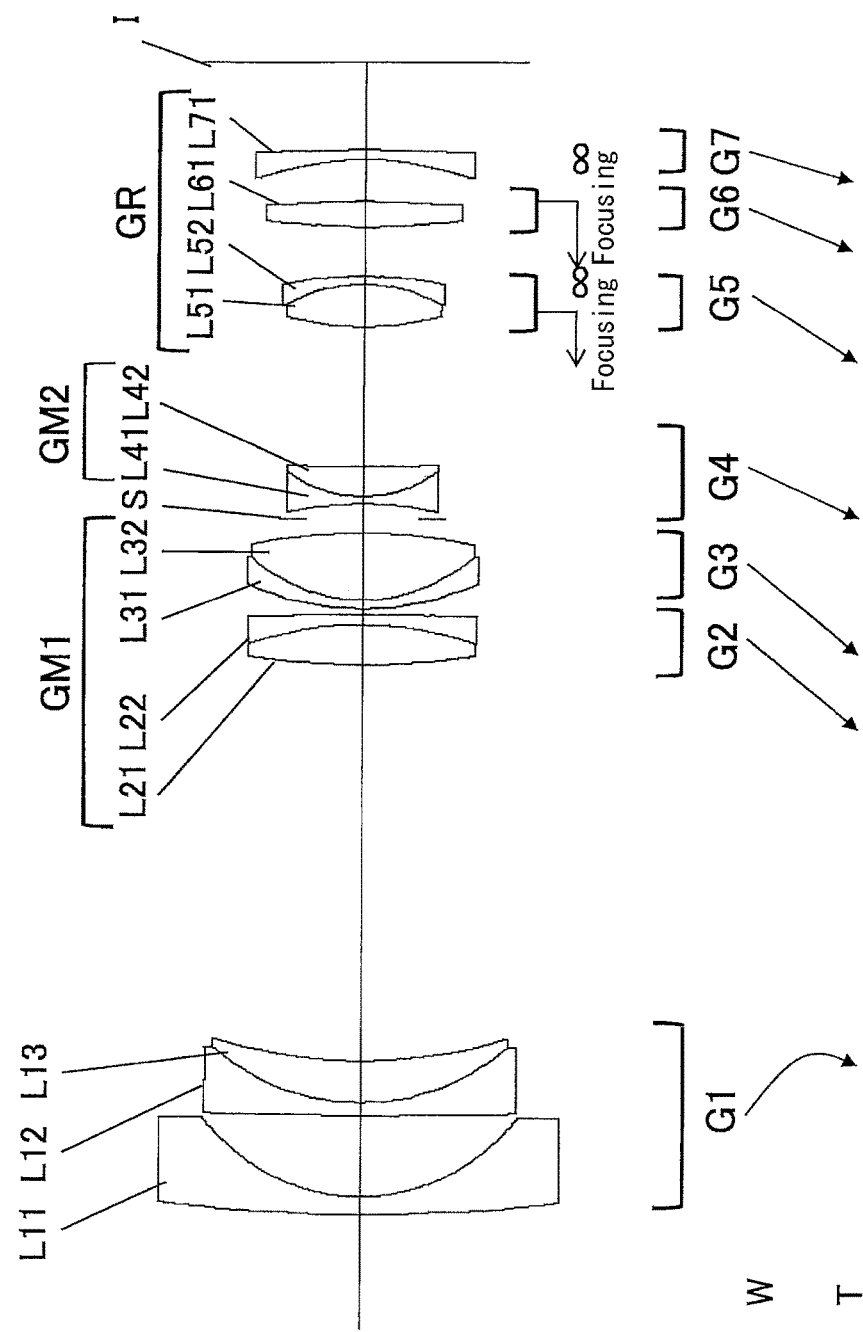
FIG. 16 is a sectional view of a variable magnification optical system according to a Sixth Example.

FIG. 16 is a sectional view of a variable magnification optical system according to a Sixth Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of, in order from the object side, a second lens group G2 having positive refractive power and a third lens group G3 having positive refractive power.

The second intermediate lens group GM2 is composed of a fourth lens group G4.

The rear lens group GR is composed of, in order from the object side, a fifth lens group G5 having positive refractive power, a sixth lens group G6 having positive refractive power, and a seventh lens group G7 having negative refractive power.

The first lens group G1 consists of, in order from the object side, a negative meniscus lens L11 having a convex surface facing the object side, and a cemented negative lens constructed by a negative meniscus lens L12 having a convex surface facing the object side cemented with a positive meniscus lens L13 having a convex surface facing the object side.

The second lens group G2 consists of a cemented positive lens constructed by a double convex positive lens L21 cemented with a negative meniscus lens L22 having a concave surface facing the object.

The third lens group G3 consists of a cemented positive lens constructed by a negative meniscus lens L31 having a convex surface facing the object side cemented with a double convex positive lens L32.

The fourth lens group G4 consists of a cemented negative lens constructed by a double concave negative lens L41 cemented with a positive meniscus lens L42 having a convex surface facing the object side.

The fifth lens group G5 consists of a cemented positive lens constructed by a double convex positive lens L51 cemented with a negative meniscus lens L52 having a concave surface facing the object side.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving the fifth lens group G5 and the sixth lens group G6 along the optical axis independently toward the object as respective focusing lens groups.

Table 6 below shows various values of the variable magnification optical system relating to the present Example.

TABLE 6

Sixth Example

[Surface Data]

| m | r | d | nd | νd |
|---|---|---|---|---|
| OP | ∞ | | | |
| 1 | 259.2015 | 2.900 | 1.74389 | 49.53 |
| *2 | 30.9799 | 13.410 | | |
| 3 | 1201.6909 | 2.100 | 1.59349 | 66.99 |
| 4 | 36.4155 | 6.936 | 2.00100 | 29.14 |
| 5 | 81.5436 | Variable | | |
| 6 | 124.3745 | 6.555 | 1.80400 | 46.60 |
| 7 | −55.7538 | 1.500 | 1.72825 | 28.38 |
| 8 | −633.0468 | Variable | | |
| 9 | 44.9659 | 1.500 | 1.85000 | 27.03 |
| 10 | 27.3358 | 10.990 | 1.59319 | 67.90 |
| 11 | −89.5168 | Variable | | |
| 12(S) | ∞ | 2.562 | | |
| 13 | −58.2664 | 1.300 | 1.68893 | 31.16 |
| 14 | 20.8969 | 4.742 | 1.80809 | 22.74 |
| 15 | 201.5296 | Variable | | |
| 16 | 52.2605 | 6.900 | 1.48749 | 70.31 |
| 17 | −26.1209 | 1.300 | 1.69895 | 30.13 |
| 18 | −72.7540 | Variable | | |
| 19 | 130.0000 | 4.200 | 1.58913 | 61.15 |
| *20 | −100.4826 | Variable | | |
| *21 | −44.3630 | 1.500 | 1.58913 | 61.15 |
| 22 | −412.9422 | BF | | |
| I | ∞ | | | |

[Aspherical Surface Data]

m: 2

κ = 0.0000
A4 = 3.40299E−06
A6 = 1.78453E−09
A8 = −2.01869E−13
A10 = 1.07948E−15
A12 = 2.74510E−19 m: 20

κ = 1.0000
A4 = 8.80591E−06
A6 = −1.07404E−09
A8 = 1.74456E−11
A10 = −2.66494E−14 m: 21

κ = 1.0000
A4 = 6.66893E−06
A6 = −5.20154E−09
A8 = 5.00802E−12
A10 = −7.75803E−15

TABLE 6-continued

Sixth Example

[Various Data]
Variable magnification ratio 2.99

| | W | M | T |
|---|---|---|---|
| f | 22.7 | 50.0 | 67.9 |
| FNO | 2.92 | 2.92 | 2.92 |
| 2ω | 91.30 | 45.88 | 33.64 |
| Ymax | 19.36 | 21.60 | 21.60 |
| TLL | 188.49 | 156.49 | 165.34 |
| BF | 14.19 | 20.41 | 24.73 |

| | W INF | M INF | T INF | W CLO | M CLO | T CLO |
|---|---|---|---|---|---|---|
| d5 | 64.909 | 10.197 | 2.263 | 64.909 | 10.197 | 2.263 |
| d8 | 1.000 | 1.000 | 1.000 | 1.000 | 1.000 | 1.000 |
| d11 | 2.200 | 12.573 | 28.831 | 2.200 | 12.573 | 28.831 |
| d15 | 22.896 | 13.304 | 11.893 | 22.388 | 12.281 | 10.318 |
| d18 | 8.047 | 19.430 | 19.884 | 7.707 | 19.294 | 20.259 |
| d20 | 6.853 | 11.181 | 8.344 | 7.701 | 12.340 | 9.543 |

[Lens Group Data]

| Group | ST | f |
|---|---|---|
| 1 | 1 | −45.334 |
| 2 | 6 | 112.275 |
| 3 | 9 | 63.547 |
| 4 | 12 | −98.234 |
| 5 | 16 | 92.914 |
| 6 | 19 | 96.856 |
| 7 | 21 | −84.494 |

[Values for Conditional Expressions]

(1) |fF|/|fRL| = 1.100
(2) BFw/fw = 0.625
(3) |fF|/ft = 1.368
(4) f1N/f1 = 1.049
(5) D1Mw/fw = 2.859
(6) νM1P/νM1N = 2.393
(7) fM1P/fM1N = 0.435
(8) ωw = 45.65°

Figure 17A:
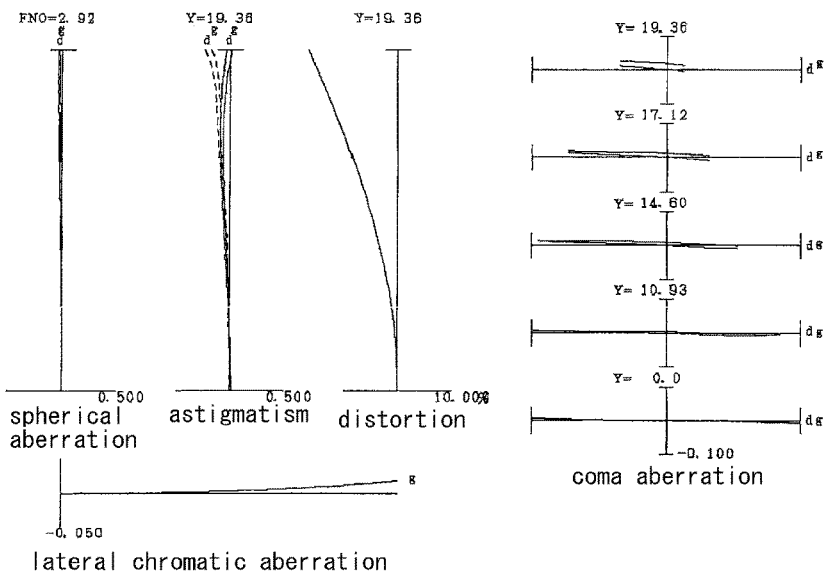
FIG. 17A, FIG. 17B and FIG. 17C are graphs showing various aberrations upon focusing on an infinite distance object, respectively, in the wide angle end state, in the intermediate focal length state, and in the telephoto end state, of the variable magnification optical system according to the Sixth Example.
Figure 17B:
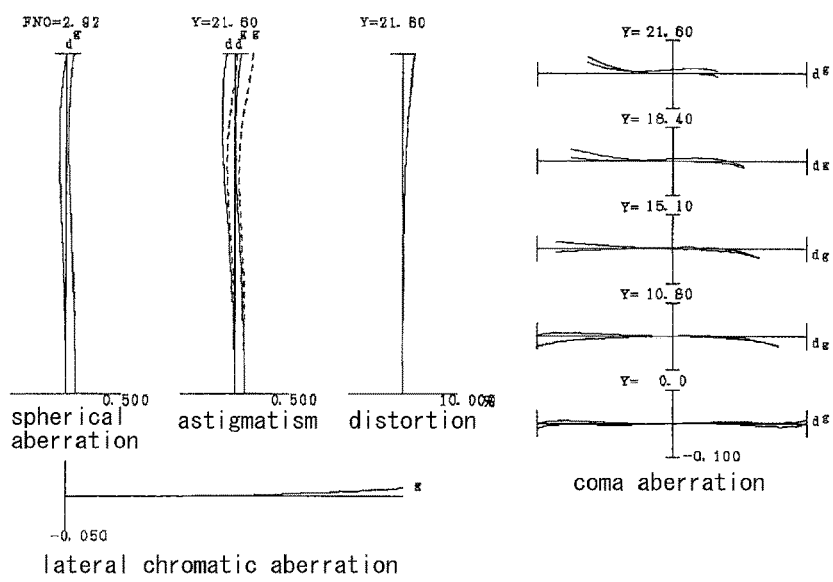
Figure 17C:
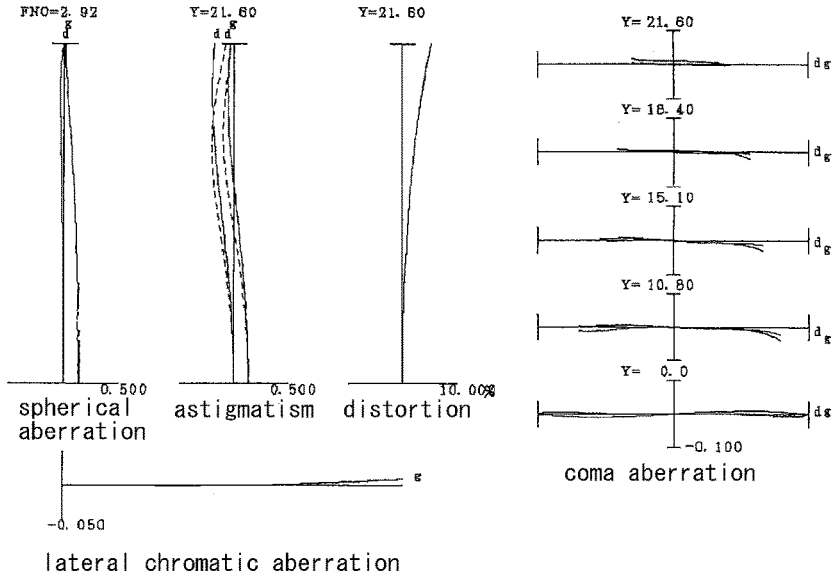

FIG. 17A, FIG. 17B and FIG. 17C are graphs showing various aberrations upon focusing on an infinite distance object, respectively, in the wide angle end state, in the intermediate focal length state and in the telephoto end state, of the variable magnification optical system according to the Sixth Example.

Figure 18A:
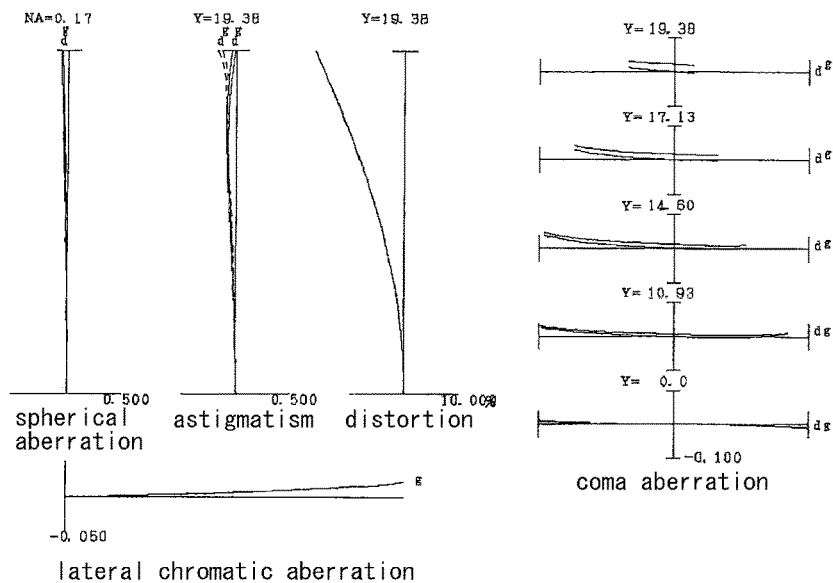
FIG. 18A, FIG. 18B and FIG. 18C are graphs showing various aberrations upon focusing on a close distance object, respectively, in the wide angle end state, in the intermediate focal length state, and in the telephoto end state, of the variable magnification optical system according to the Sixth Example.
Figure 18B:
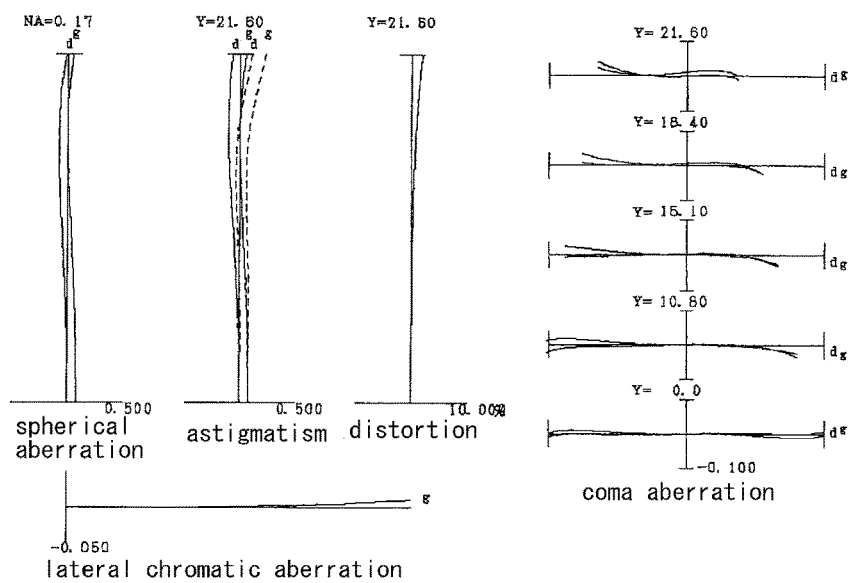
Figure 18C:
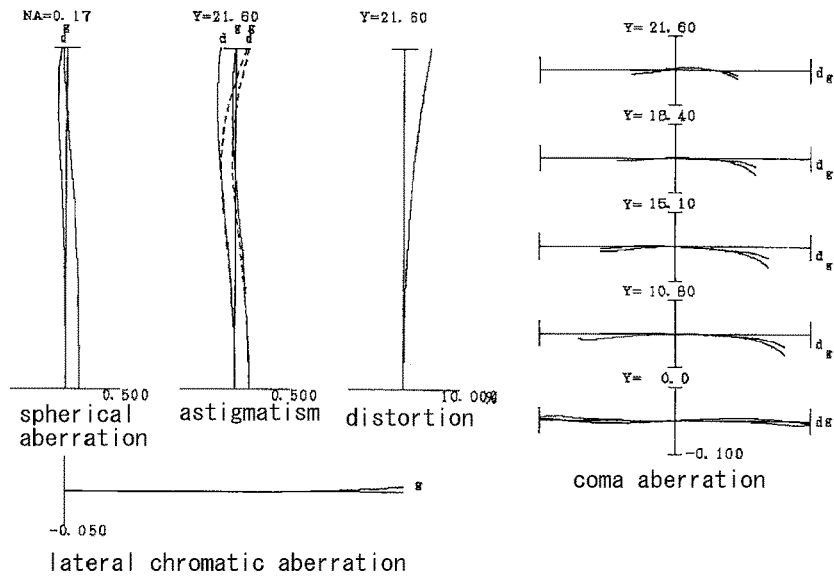

FIG. 18A, FIG. 18B and FIG. 18C are graphs showing various aberrations upon focusing on a close distance object, respectively, in the wide angle end state, in the intermediate focal length state and in the telephoto end state, of the variable magnification optical system according to the Sixth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

Seventh Example

Figure 19:
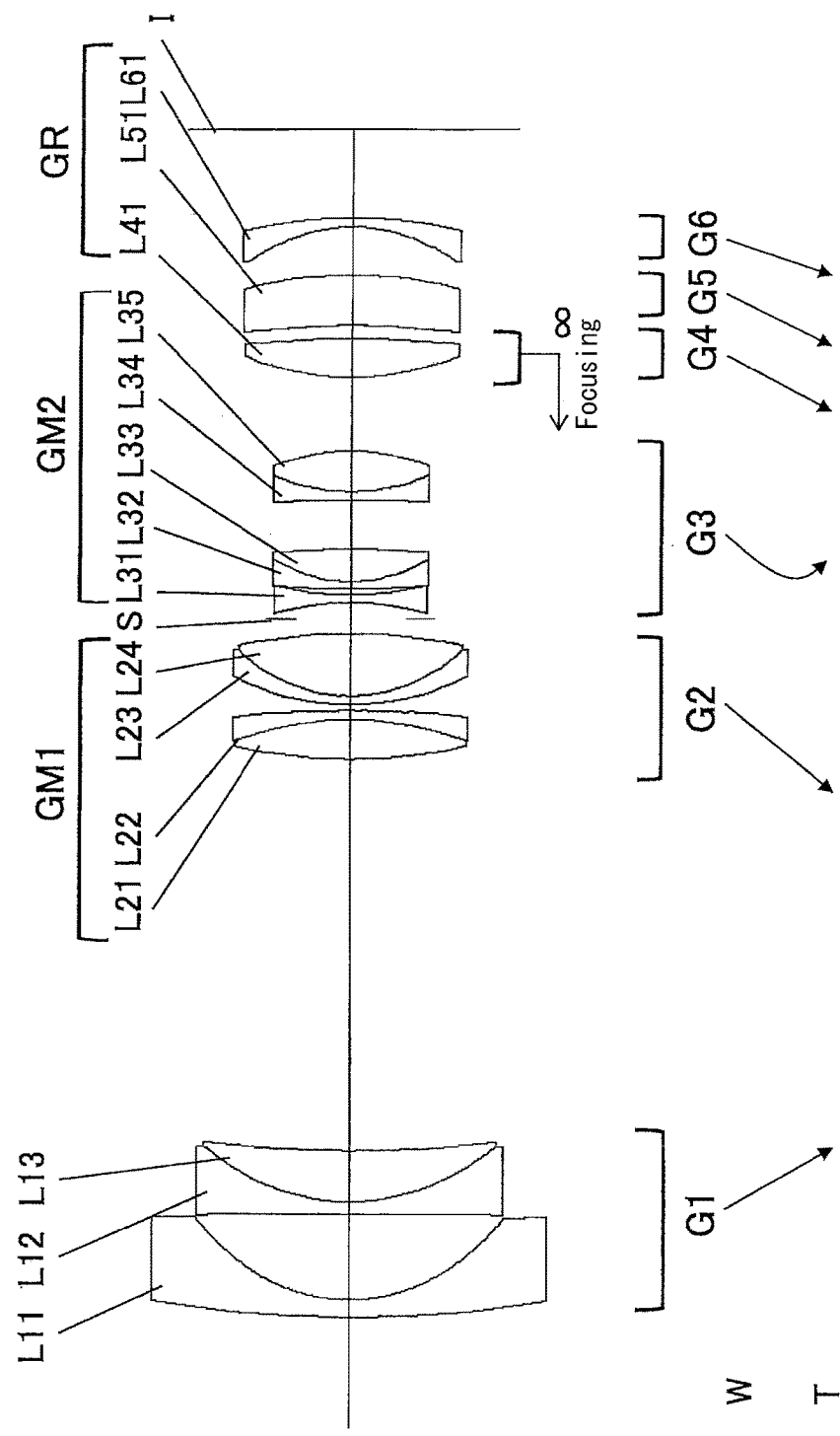
FIG. 19 is a sectional view of a variable magnification optical system according to a Seventh Example.

FIG. 19 is a sectional view of a variable magnification optical system according to a Seventh Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of a second lens group G2 having positive refractive power.

The second intermediate lens group GM2 is composed of a third lens group G3.

The rear lens group GR is composed of, in order from the object side, a fourth lens group G4 having positive refractive power, a fifth lens group G5 having positive refractive power and a sixth lens group G6 having negative refractive power.

The first lens group G1 consists of, in order from the object side, a negative meniscus lens L11 having a convex surface facing the object side, and a cemented negative lens constructed by a double concave negative lens L12 cemented with a positive meniscus lens L13 having a convex surface facing the object side.

The second lens group G2 consists of, in order from the object side, a cemented positive lens constructed by a double convex positive lens L21 cemented with a negative meniscus lens L22 having a concave surface facing the object side, and a cemented positive lens constructed by a negative meniscus lens L23 having a convex surface facing the object side cemented with a double convex positive lens L24.

The third lens group G3 consists of, in order from the object side, a double concave negative lens L31, a cemented positive lens constructed by a negative meniscus lens L32 having a convex surface facing the object side cemented with a double convex positive lens L33 and a cemented positive lens constructed by a double concave negative lens L33 cemented with a double convex positive lens L34.

The fourth lens group G4 consists of a double convex positive lens L41.

The fifth lens group G5 consists of a positive meniscus lens L51 having a concave surface facing the object side.

The sixth lens group G6 consists of a negative meniscus lens L61 having a concave surface facing the object side.

In the variable magnification optical system according to the present Example, upon varying magnification between the wide angle end state and the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied.

In the variable magnification optical system according to the present Example, focusing from an infinite distance object to a close distance object is carried out by moving the fourth lens group G4 along the optical axis toward the object as a focusing lens group.

Table 7 below shows various values of the variable magnification optical system relating to the present Example.

TABLE 7

Seventh Example

[Surface Data]

| m | r | d | nd | νd |
|---|---|---|---|---|
| OP | ∞ | | | |
| 1 | 200.0000 | 2.900 | 1.74389 | 49.53 |
| *2 | 28.4969 | 14.488 | | |
| *3 | −5398.0521 | 2.100 | 1.69343 | 53.30 |
| 4 | 36.6732 | 8.665 | 1.85000 | 27.03 |
| 5 | 187.9030 | Variable | | |
| 6 | 91.7611 | 6.648 | 1.80400 | 46.60 |
| 7 | −55.7166 | 1.500 | 1.84666 | 23.80 |
| 8 | −203.7508 | 1.000 | | |
| 9 | 42.9517 | 1.500 | 1.84666 | 23.80 |
| 10 | 26.9325 | 10.417 | 1.59319 | 67.90 |
| 11 | −98.1277 | Variable | | |
| 12(S) | ∞ | 2.820 | | |
| 13 | −45.5709 | 1.300 | 1.80400 | 46.60 |
| 14 | 57.2932 | 0.868 | | |
| 15 | 120.2007 | 1.300 | 1.71999 | 50.27 |
| 16 | 23.4150 | 5.485 | 1.80809 | 22.74 |
| 17 | −181.7727 | 8.145 | | |
| 18 | −482.8882 | 1.500 | 1.90200 | 25.26 |
| 19 | 32.5158 | 6.892 | 1.59319 | 67.90 |
| 20 | −35.1691 | Variable | | |
| 21 | 47.0119 | 6.500 | 1.48749 | 70.32 |
| 22 | −168.6086 | Variable | | |
| *23 | −111.3712 | 8.500 | 1.55332 | 71.68 |
| 24 | −71.1538 | Variable | | |
| 25 | −29.2568 | 1.500 | 1.67798 | 54.89 |
| *26 | −86.3647 | BF | | |
| I | ∞ | | | |

[Aspherical Data]

m: 2

κ = 0.0000
A4 = 3.18150E−06
A6 = 1.29143E−09
A8 = −4.45637E−13
A10 = 2.21668E−15
A12 = −6.34900E−19 m: 3

κ = 1.0000
A4 = −1.73423E−07
A6 = −4.20289E−10
A8 = 7.96941E−13
A10 = −4.23115E−16 m: 23

κ = 1.0000
A4 = 2.52053E−06
A6 = 5.96196E−09
A8 = 1.22687E−12
A10 = −9.60903E−15 m: 26

κ = 1.0000
A4 = −3.00816E−06
A6 = 2.06736E−09
A8 = 2.50057E−11
A10 = −4.88231E−14

[Various Data]
Variable magnification ratio 2.99

| | W | M | T |
|---|---|---|---|
| f | 22.7 | 50.0 | 67.9 |
| FNO | 2.92 | 2.92 | 2.92 |
| 2ω | 90.82 | 47.84 | 35.28 |
| Ymax | 19.42 | 21.60 | 21.60 |
| TL | 199.64 | 180.36 | 175.49 |
| BF | 14.74 | 19.85 | 28.18 |

TABLE 7-continued

Seventh Example

|  | W INF | M INF | T INF | W CLO | M CLO | T CLO |
|---|---|---|---|---|---|---|
| d5 | 65.865 | 14.675 | 2.075 | 65.865 | 14.675 | 2.075 |
| d11 | 2.500 | 9.999 | 19.897 | 2.500 | 9.999 | 19.897 |
| d20 | 12.261 | 28.219 | 17.697 | 11.472 | 26.839 | 16.195 |
| d22 | 2.239 | 3.776 | 2.000 | 3.027 | 5.155 | 3.503 |
| d24 | 8.010 | 9.814 | 11.610 | 8.010 | 9.814 | 11.610 |

[Lens Group Data]

| Group | ST | f |
|---|---|---|
| 1 | 1 | −43.315 |
| 2 | 6 | 37.392 |
| 3 | 12 | −136.693 |
| 4 | 21 | 76.163 |
| 5 | 23 | 331.174 |
| 6 | 25 | −65.961 |

[Values for Conditional Expressions]

| (1) | $|fF|/|fRL| = 1.155$ |
| (2) | $BFw/fw = 0.649$ |
| (3) | $|fF|/ft = 1.122$ |
| (4) | $f1N/f1 = 1.039$ |
| (5) | $D1Mw/fw = 2.902$ |
| (6) | $vM1P/vM1N = 2.853$ |
| (7) | $fM1P/fM1N = 0.413$ |
| (8) | $\omega w = 45.41°$ |

Figure 20A:
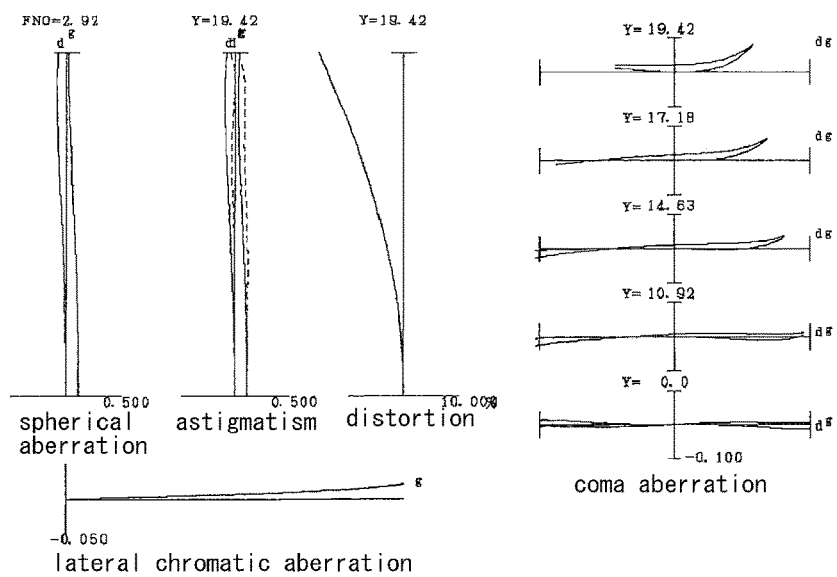
FIG. 20A, FIG. 20B and FIG. 20C are graphs showing various aberrations upon focusing on an infinite distance object, respectively, in the wide angle end state, in the intermediate focal length state, and in the telephoto end state, of the variable magnification optical system according to the Seventh Example.
Figure 20B:
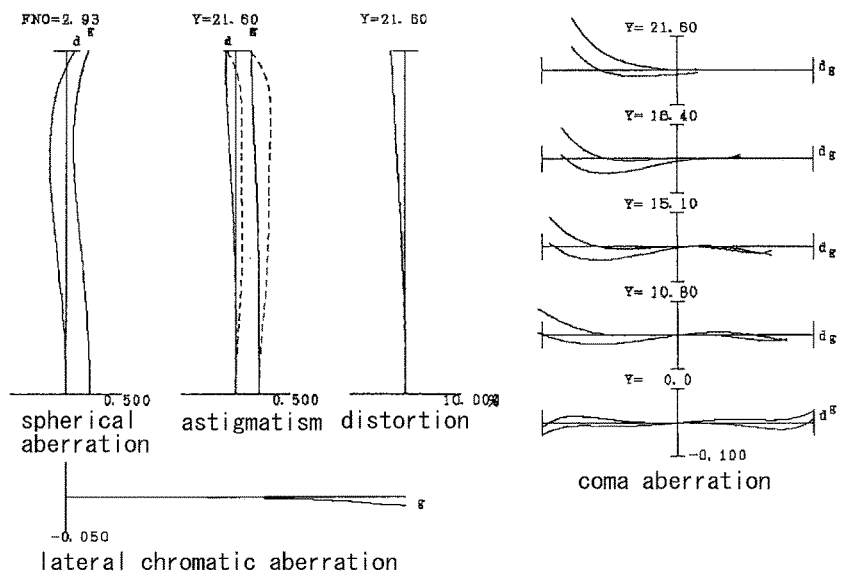
Figure 20C:
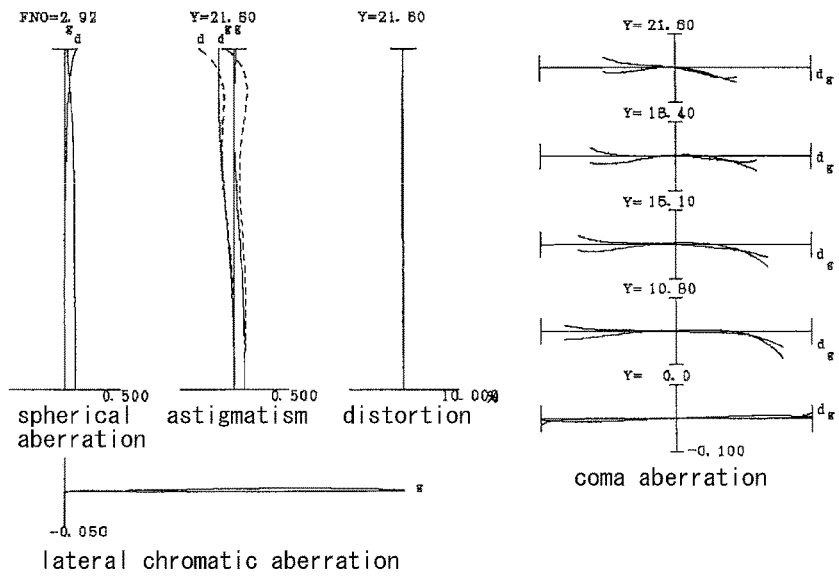

FIG. 20A, FIG. 20B and FIG. 20C are graphs showing various aberrations upon focusing on an infinite distance object, respectively, in the wide angle end state, in the intermediate focal length state and in the telephoto end state, of the variable magnification optical system according to the Seventh Example.

Figure 21A:
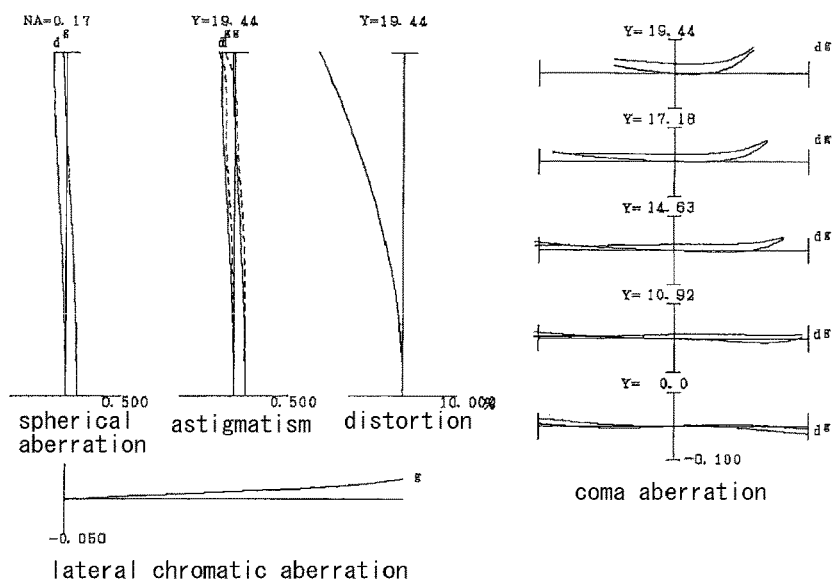
FIG. 21A, FIG. 21B and FIG. 21C are graphs showing various aberrations upon focusing on a close distance object, respectively, in the wide angle end state, in the intermediate focal length state, and in the telephoto end state, of the variable magnification optical system according to the Seventh Example.
Figure 21B:
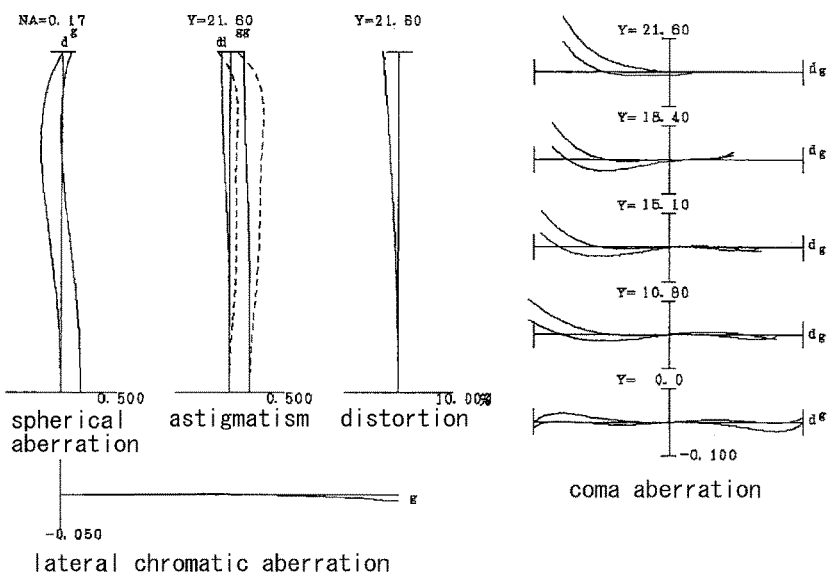
Figure 21C:
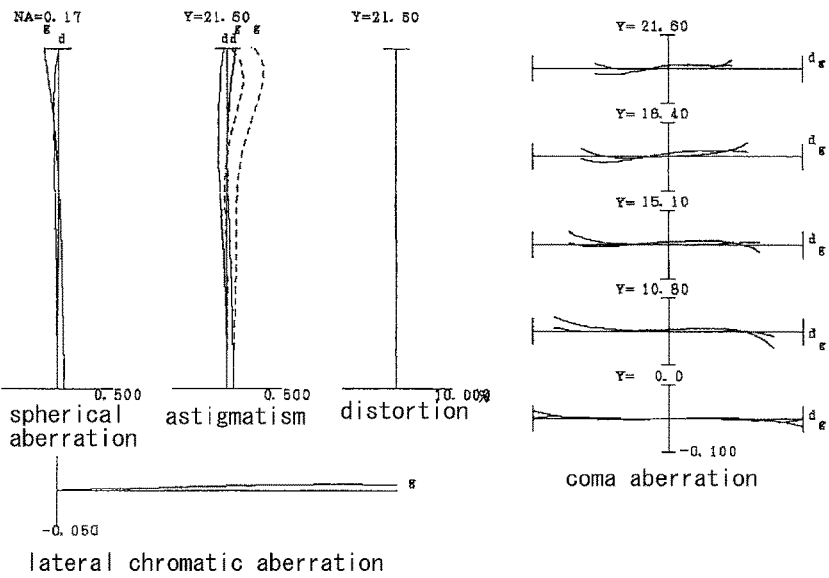

FIG. 21A, FIG. 21B and FIG. 21C are graphs showing various aberrations upon focusing on a close distance object, respectively, in the wide angle end state, in the intermediate focal length state and in the telephoto end state, of the variable magnification optical system according to the Seventh Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

Eighth Example

Figure 22:
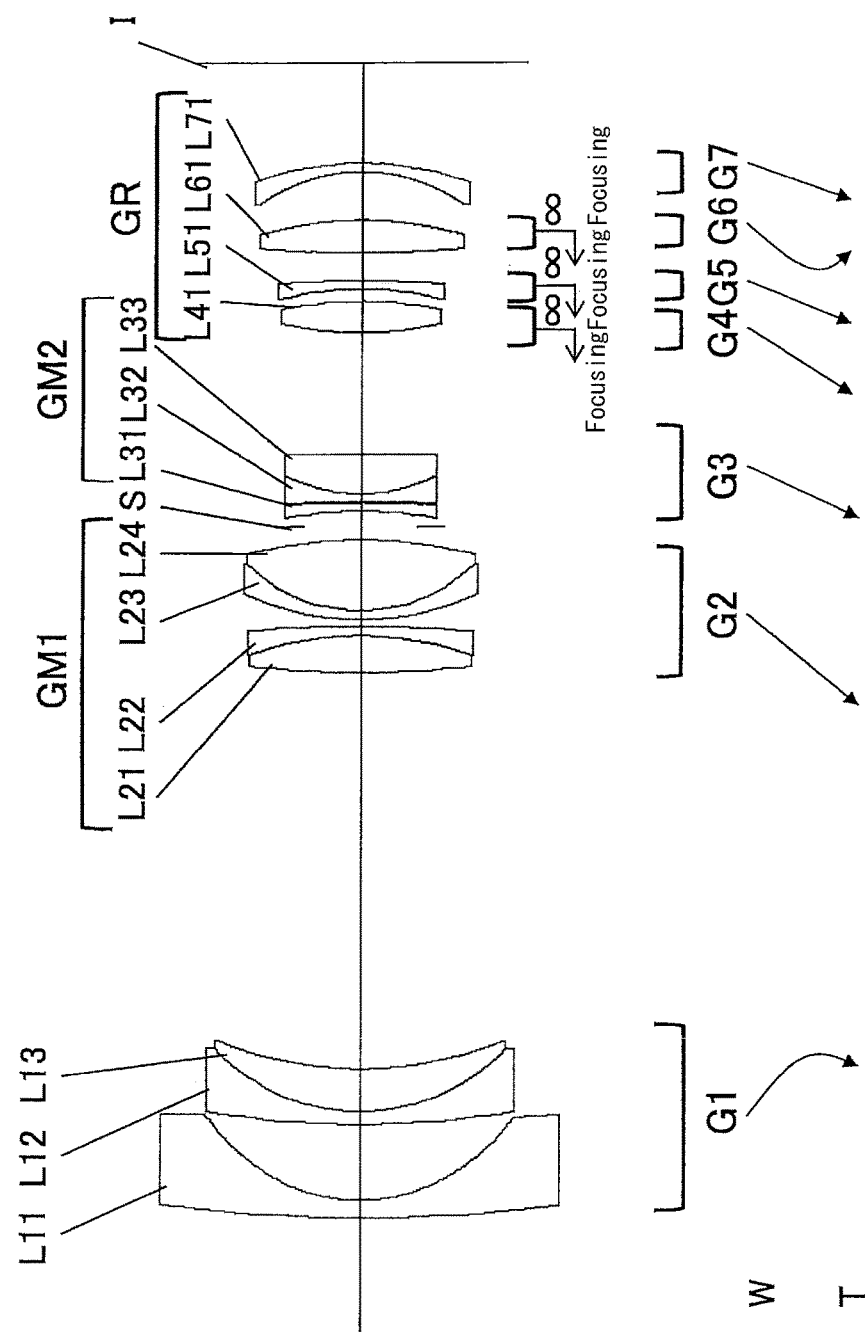
FIG. 22 is a sectional view of a variable magnification optical system according to an Eighth Example.

FIG. 22 is a sectional view of a variable magnification optical system according to an Eighth Example of the present application.

The variable magnification optical system according to the present Example is composed of, in order from an object side, a first lens group G1 having negative refractive power, a first intermediate lens group GM1 having positive refractive power, an aperture stop S, a second intermediate lens group GM2 having negative refractive power, and a rear lens group GR having positive refractive power.

The first intermediate lens group GM1 is composed of a second lens group G2 having positive refractive power.

The second intermediate lens group GM2 is composed of a third lens group G3.

The rear lens group GR is composed of, in order from the object side, a fourth lens group G4 having positive refractive power, a fifth lens group G5 having negative refractive power, a sixth lens group G6 having positive refractive power and a seventh lens group G7 having negative refractive power.

The first lens group G1 consists of, in order from the object side, a negative meniscus lens L11 having a convex surface facing the object side, and a cemented positive lens constructed by a negative meniscus lens L12 having a convex surface facing the object side cemented with a positive meniscus lens L13 having a convex surface facing the object side.

The second lens group G2 consists of, in order from the object side, a cemented positive lens constructed by a double convex positive lens L21 cemented with a negative meniscus lens L22 having a concave surface facing the object side, and a cemented positive lens constructed by a negative meniscus lens L23 having a convex surface facing the object side cemented with a double convex positive lens L24.

The third lens group G3 consists of, in order from the object side, a negative meniscus lens L31 having a concave surface facing the object side, and a cemented positive lens constructed by a double concave negative lens L32 cemented with a positive meniscus lens L33 having a convex surface facing the object side.

The fourth lens group G4 consists of a double convex positive lens L41.

The fifth lens group G5 consists of a negative meniscus lens L51 having a concave surface facing the object side.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving the fourth lens group G4, the fifth lens group G5 and the sixth lens group G6 independently from each other along the optical axis toward the object as respective focusing lens groups.

Table 8 below shows various values of the variable magnification optical system relating to the present Example.

TABLE 8

Eighth Example

[Surface Data]

| m | r | d | nd | vd |
|---|---|---|---|---|
| OP | ∞ | | | |
| 1 | 250.0000 | 2.900 | 1.74389 | 49.53 |
| *2 | 28.0269 | 12.424 | | |
| 3 | 154.1167 | 2.100 | 1.59349 | 67.00 |

TABLE 8-continued

Eighth Example

| | | | | |
|---|---|---|---|---|
| 4 | 32.5416 | 6.969 | 2.00069 | 25.46 |
| 5 | 61.8764 | Variable | | |
| 6 | 175.0869 | 5.997 | 1.81600 | 46.59 |
| 7 | −52.8034 | 1.500 | 1.85000 | 27.03 |
| 8 | −204.9882 | 1.000 | | |
| 9 | 45.2860 | 1.500 | 1.80518 | 25.45 |
| 10 | 26.6188 | 11.527 | 1.60300 | 65.44 |
| 11 | −76.6492 | Variable | | |
| 12(S) | ∞ | 2.465 | | |
| 13 | −64.5009 | 1.300 | 1.90265 | 35.72 |
| 14 | −217.6883 | 0.200 | | |
| 15 | −214.1041 | 1.300 | 1.67270 | 32.18 |
| 16 | 26.6878 | 6.400 | 1.80809 | 22.74 |
| 17 | 502.6822 | Variable | | |
| 18 | 65.6282 | 5.000 | 1.48749 | 70.32 |
| 19 | −65.3105 | Variable | | |
| 20 | −52.0851 | 1.300 | 1.84666 | 23.80 |
| 21 | −201.9547 | Variable | | |
| 22 | 185.0000 | 5.300 | 1.58913 | 61.15 |
| *23 | −50.5905 | Variable | | |
| *24 | −27.3977 | 1.500 | 1.58913 | 61.15 |
| 25 | −49.4756 | BF | | |
| I | ∞ | | | |

[Aspherical Data]

m: 2

κ = 0.0000
A4 = 3.95960E−06
A6 = 3.76748E−09
A8 = −5.23494E−12
A10 = 1.04782E−14
A12 = −4.82160E−18 m: 23

κ = 1.0000
A4 = 6.76320E−06
A6 = −8.33082E−09
A8 = 3.88079E−11
A10 = −7.09278E−14 m: 24

κ = 1.0000
A4 = 5.00393E−06
A6 = −8.92918E−09
A8 = 2.86537E−11
A10 = −5.32582E−14

[Various Data]
Variable magnification ratio 2.99

| | W | M | T |
|---|---|---|---|
| f | 22.7 | 50.0 | 67.9 |
| FNO | 3.03 | 3.00 | 3.03 |
| 2ω | 91.04 | 45.96 | 33.62 |
| Ymax | 19.30 | 21.60 | 21.60 |
| TL | 188.49 | 155.49 | 167.35 |
| BF | 16.20 | 23.37 | 32.67 |

| | W INF | M INF | T INF | W CLO | M CLO | T CLO |
|---|---|---|---|---|---|---|
| d5 | 64.883 | 10.266 | 5.946 | 64.883 | 10.266 | 5.946 |
| d11 | 2.200 | 12.775 | 27.038 | 2.200 | 12.775 | 27.038 |
| d17 | 20.035 | 8.462 | 6.571 | 19.026 | 7.439 | 4.593 |
| d19 | 2.030 | 3.706 | 4.816 | 1.360 | 3.164 | 4.349 |
| d21 | 4.601 | 9.046 | 14.467 | 4.908 | 8.936 | 15.092 |
| d23 | 7.862 | 17.178 | 5.159 | 9.234 | 18.853 | 6.979 |

[Lens Group Data]

| Group | ST | f |
|---|---|---|
| 1 | 1 | −42.744 |
| 2 | 6 | 40.599 |
| 3 | 12 | −105.371 |

TABLE 8-continued

Eighth Example

| | | |
|---|---|---|
| 4 | 18 | 68.000 |
| 5 | 20 | −83.229 |
| 6 | 22 | 68.000 |
| 7 | 24 | −106.909 |

[Values for Conditional Expressions]

(1) |fF|/|fRL| = 0.636
(2) BFw/fw = 0.713
(3) |fF|/ft = 1.001
(4) f1N/f1 = 0.998
(5) D1Mw/fw = 2.858
(6) vM1P/vM1N = 2.421
(7) fM1P/fM1N = 0.456
(8) ωw = 45.52°

Figure 23A:
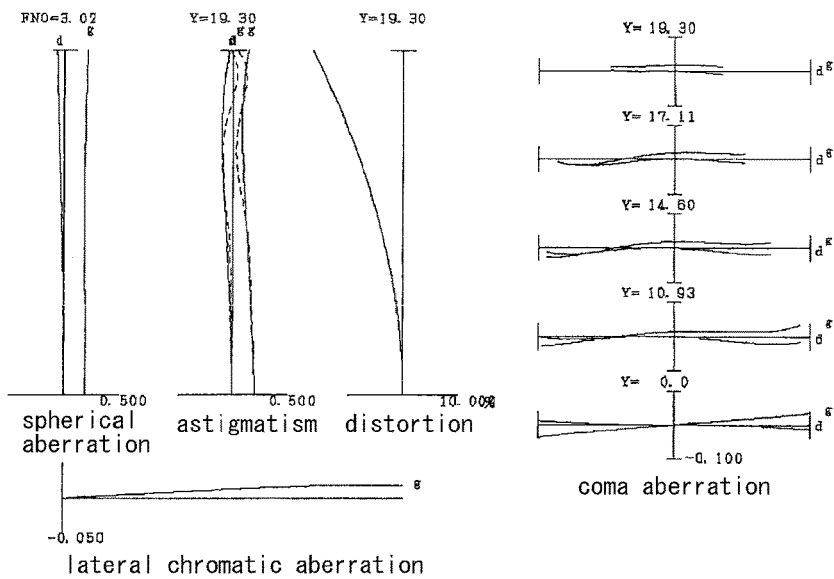
FIG. 23A, FIG. 23B and FIG. 23C are graphs showing various aberrations upon focusing on an infinite distance object, respectively, in the wide angle end state, in the intermediate focal length state, and in the telephoto end state, of the variable magnification optical system according to the Eighth Example.
Figure 23B:
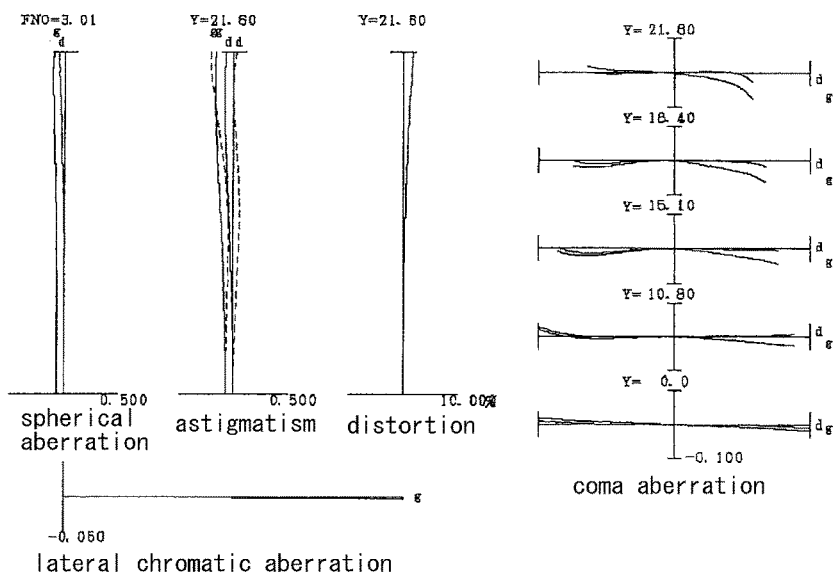
Figure 23C:
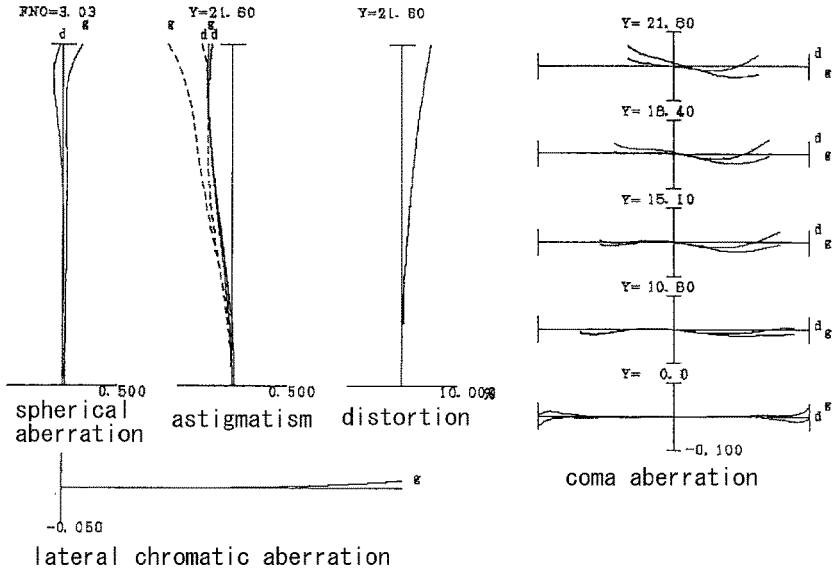

FIG. 23A, FIG. 23B and FIG. 23C are graphs showing various aberrations upon focusing on an infinite distance object, respectively, in the wide angle end state, in the intermediate focal length state and in the telephoto end state, of the variable magnification optical system according to the Eighth Example.

Figure 24A:
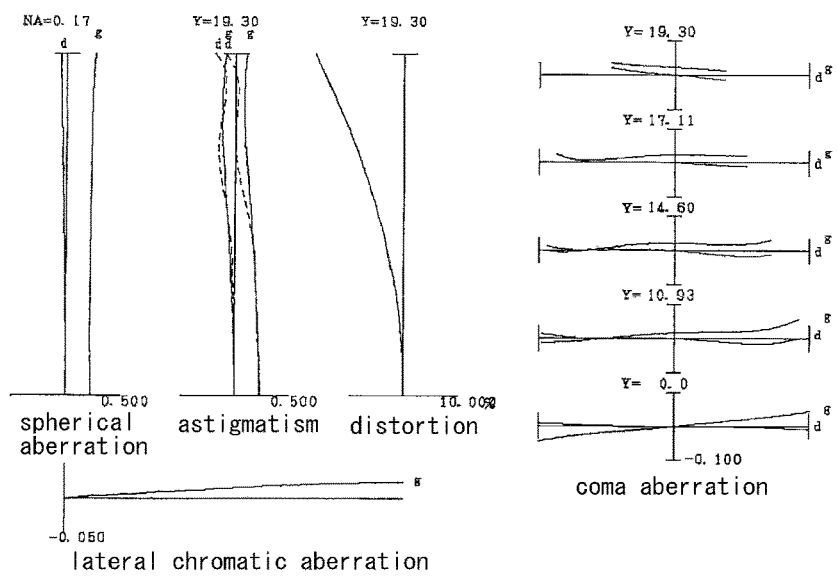
FIG. 24A, FIG. 24B and FIG. 24C are graphs showing various aberrations upon focusing on a close distance object, respectively, in the wide angle end state, in the intermediate focal length state, and in the telephoto end state, of the variable magnification optical system according to the Eighth Example.
Figure 24B:
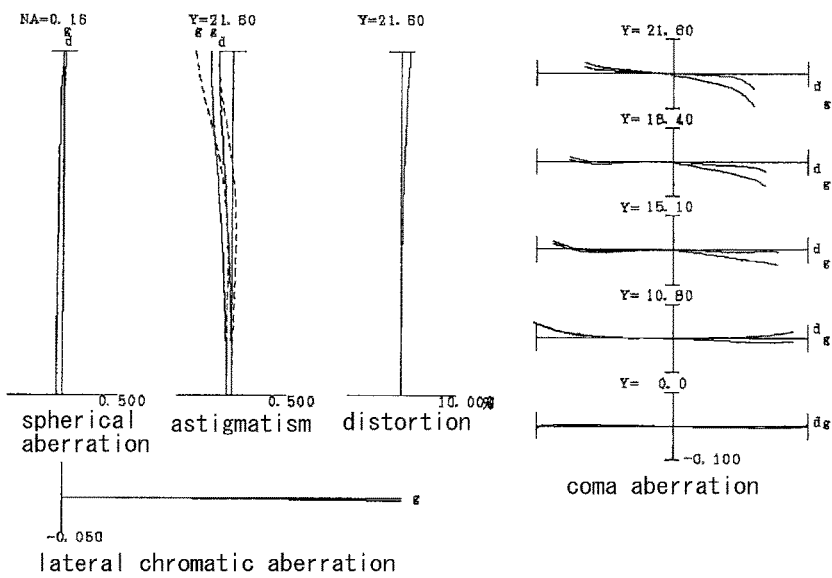
Figure 24C:
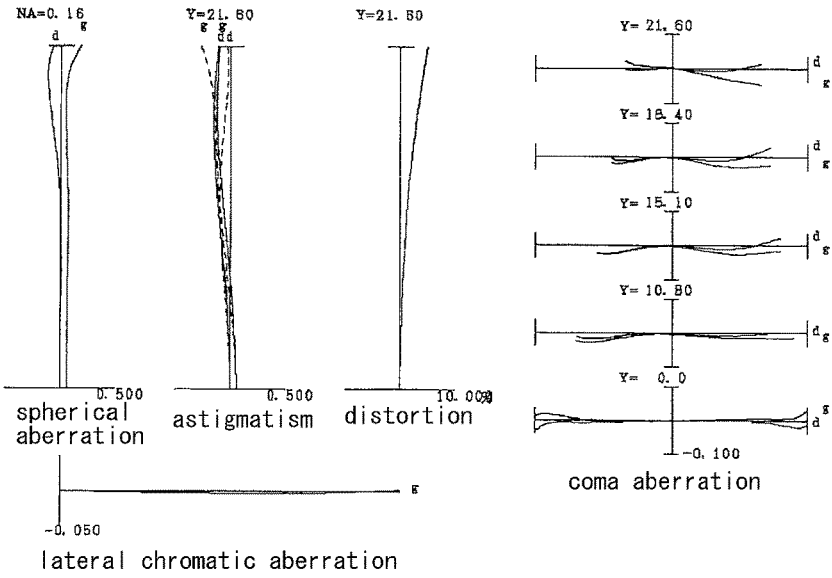

FIG. 24A, FIG. 24B and FIG. 24C are graphs showing various aberrations upon focusing on a close distance object, respectively, in the wide angle end state, in the intermediate focal length state and in the telephoto end state, of the variable magnification optical system according to the Eighth Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

According to each of the above described Examples, it is possible to realize a variable magnification optical system that has focusing lens group (s) which is (are) light in weight and downsized and which can suppress superbly variations in aberrations upon varying magnification from a wide angle end state to a telephoto end state and variations in aberrations upon carrying out focusing from an infinite distance object to a close distance object. In this variable magnification optical system, since the focusing lens group(s) is(are) made small in size and light in weight, driving mechanism for the focusing lens group(s) is(are) also downsized, so it is possible to realize high speed as well as noiseless focusing operation without making lens barrel large.

Meanwhile, it is noted that each of the above described Examples is a concrete example of the invention of the present application, and the invention of the present application is not limited to them. The contents described below can be adopted appropriately without deteriorating optical performance of the variable magnification optical systems according to the present embodiment.

Although variable magnification optical systems having a five group configuration, a six group configuration, and a seven group configuration, were illustrated above as numerical examples of the variable magnification optical systems according to the present application, the invention of the present application is not limited to them and variable magnification optical systems having other configurations, such as eight group configuration or the like, can be configured. Concretely, a lens configuration that a lens or a lens group is added to the most object side or the most image side of the variable magnification optical system according to each of the above described Examples is possible. Alternatively, a lens or a lens group may be added between the first lens group G1 and the first intermediate lens group GM1. Alternatively, a lens or a lens group may be added between the first intermediate lens group GM1 and the second intermediate lens group GM2. Alternatively, a lens or a lens group may be added between the second intermediate lens group GM2 and the rear lens group GR.

Further, in each of the above described Examples, configurations that the first intermediate lens group GM1 is composed of the second lens group G2 or of the second lens group G2 and the third lens groups G3, were illustrated, but configurations are not limited to them. Further, in each of the above described Examples, configurations that the second intermediate lens group GM2 is composed of the third lens group G3, or of the fourth lens group G4, or of the third lens groups G3 and the fourth lens group G4, were illustrated, but configurations are not limited to them.

Further, in each of the above described Examples, one, two or three lens groups, are adopted as focusing lens groups, but a part in lens group, or four or more lens groups may be adopted for focusing lens group (s). Each of the focusing lens groups may be composed of one or two lens components, and a configuration composed of one lens component is more preferable. Auto focusing can be applied for such focusing group (s), and drive by motor for auto focusing, such as, ultrasonic motor, stepping motor, and VCM motor may be suitably adopted.

Further, in the variable magnification optical systems according to each of the above described Examples, any lens group in the entirety thereof or a portion thereof can be moved in a direction including a component perpendicular to the optical axis as a vibration reduction lens group, or rotationally moved (swayed) in an in-plane direction including the optical axis, whereby a configuration of a vibration reduction can be taken.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical systems according to each of the above described Examples, it is preferable that the aperture stop S is disposed between the second lens group G2 and the third lens group G3, or between the third lens group G3 and the fourth lens group G4. But, the function may be substituted by a lens frame without disposing a member as an aperture stop.

Moreover, the lens surface(s) of the lenses configuring the variable magnification optical system according to each of the above described Examples, may be coated with anti-reflection coating(s) having a high transmittance in a wide wavelength region. With this contrivance, it is feasible to reduce a flare as well as ghost and attain excellent optical performance with high contrast.

Figure 25:
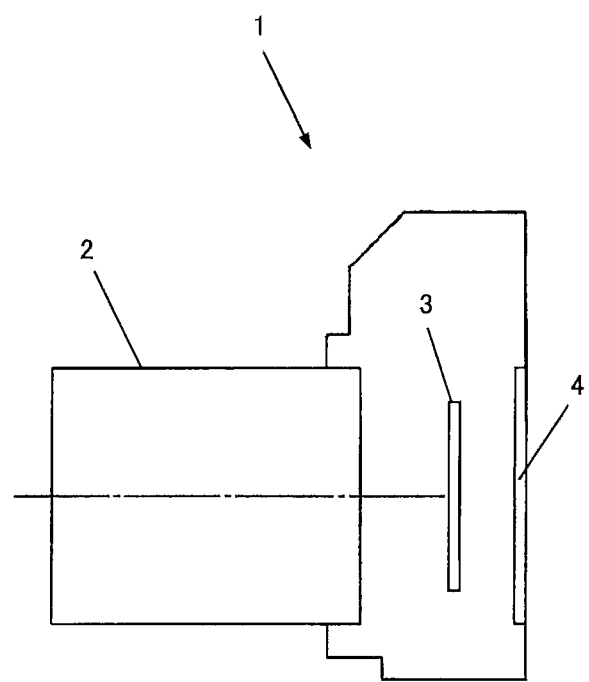
FIG. 25 is a view showing a configuration of a camera equipped with the variable magnification optical system.

Next, a camera equipped with the variable magnification optical system according to the present embodiment, will be explained with referring to FIG. 25. FIG. 25 is a view showing a configuration of the camera equipped with the variable magnification optical system according to the present embodiment. The camera 1, as shown in FIG. 25, is a so-called mirror-less camera of a lens interchangeable type equipped with the variable magnification optical system according to the first Example as an imaging lens 2.

In the present camera 1, a light emitted from an unillustrated object (an object to be photo-taken) is converged by the imaging lens 2, through a unillustrated OLPF (Optical low pass filter), and forms an image of the object on an imaging plane of an imaging portion 3. The light from the object is photo-electrically converted through a photo-electric conversion element provided on the imaging portion 3 to forma picture image of the object. This picture image is displayed on an EVF (electric view finder) 4 provided on the camera 1. Accordingly, a photographer can observe the object to be photo-taken through the EVF.

Further, upon unillustrated release button being depressed by the photographer, the picture image of the object formed by the imaging portion 3 is stored in an unillustrated memory. Thus, the photographer can take a photo of the object by the camera 1.

It is noted here that the variable magnification optical system relating to the First Example mounted on the camera 1 as the imaging lens 2, has superb optical performance as described above and the focusing lens group(s) is (are) made light in weight and small in size. In other words, by making the focusing lens group (s) small in size and light in weight, high speed focusing can be realized, and it is possible to attain superb optical performances that variations in aberrations upon varying magnification from the wide angle end state to the telephoto end state as well as variations in aberrations upon carrying out focusing from an infinite distance object to a close distance object, can be suppressed.

Incidentally, even in a case where a camera in which the variable magnification optical system according to any of the before-mentioned Second to Eighth Examples is installed as the imaging lens 2, is configured, the camera also can the same effects as those of the above-mentioned camera 1. Further, even when the variable magnification optical system according to any of the Examples is installed in a camera of a single lens reflex type equipped with a quick return mirror in which the object image is observed through a finder optical system, the camera also can have the same effects as those of the above-mentioned camera 1.

Figure 26:
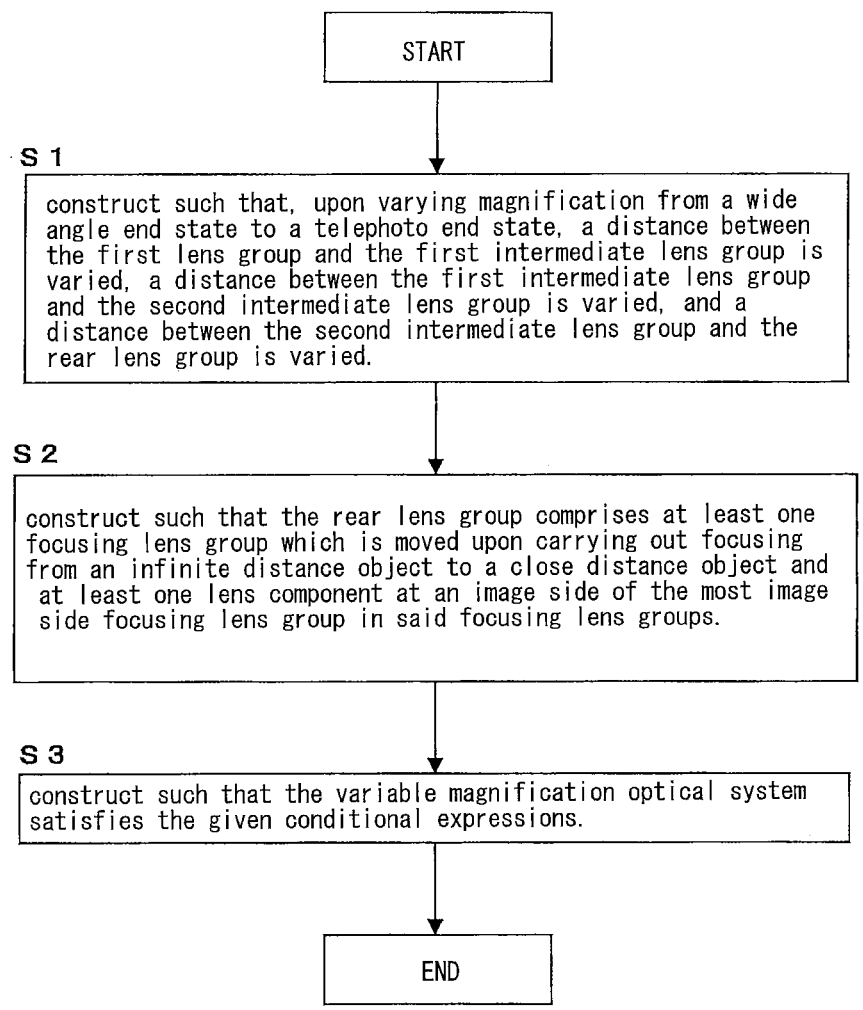
FIG. 26 is a flowchart schematically showing a method for manufacturing the variable magnification optical system.

Next, an outline of a method for manufacturing the variable magnification optical system according to the present embodiment, is described with referring to FIG. 26. FIG. 26 is a flowchart schematically showing a method for manufacturing the variable magnification optical system.

The method for manufacturing the variable magnification optical system according to the present embodiment shown in FIG. 26, is a method for manufacturing a variable magnification optical system which comprises, in order from an object side, a first lens group having negative refractive power, a first intermediate lens group having positive refractive power, a second intermediate lens group having negative refractive power and a rear lens group; the method comprising the following steps S1 to S3.

Step S1: constructing such that, upon varying magnification from a wide angle end state to a telephoto end state, a distance between said first lens group and said first intermediate lens group is varied, a distance between said first intermediate lens group and said second intermediate lens group is varied, and a distance between said second intermediate lens group and said rear lens group is varied.

Step S2: constructing such that said rear lens group comprises at least one focusing lens group which is moved upon carrying out focusing from an infinite distance object to a close distance object and at least one lens component at an image side of the most image side focusing lens group in said focusing lens groups; and Step S3: constructing such that said variable magnification optical system satisfies the following conditional expressions (1) and (2):

$$0.30 < |fF|/|fRL| < 2.50 \quad (1)$$

$$0.10 < BFw/fw < 1.00 \quad (2)$$

where fF denotes a focal length of a focus lens group having a strongest refractive power in said focusing lens groups, fRL denotes a focal length of a lens having a strongest refractive power in said at least one lens component, BFw denotes a back focus of said variable magnification optical system in the wide angle end state, and fw denotes a focal length of said variable magnification optical system in the wide angle end state.

According to the above-stated method for manufacturing the variable magnification optical system according to the present embodiment, it is possible to realize a variable magnification optical system in which focusing lens group(s) is(are)downsized and reduced in weight and which can superbly suppress variations in aberrations upon varying magnification from the wide angle end state to the telephoto end state as well as variations in aberrations upon carrying out focusing from an infinite distance object to a close distance object.

EXPLANATION OF REFERENCE SYMBOLS

G1 first lens group
G2 second lens group
G3 third lens group
G4 fourth lens group
G5 fifth lens group
G6 sixth lens group
G7 seventh lens group
GM1 first intermediate lens group
GM2 second intermediate lens group
GR rear lens group
S aperture stop
I image plane

What is claimed is:

1. A variable magnification optical system comprising, in order from an object side, a first lens group having negative refractive power, a first intermediate lens group having positive refractive power, a second intermediate lens group having negative refractive power and a rear lens group; upon varying a magnification from a wide angle end state to a telephoto end state, a distance between said first lens group and said first intermediate lens group being varied, a distance between said first intermediate lens group and said second intermediate lens group being varied, and a distance between said second intermediate lens group and said rear lens group being varied; said rear lens group comprising at least one focusing lens group which is moved upon carrying out focusing from an infinite distance object to a close distance object and at least one lens component at an image side of the most image side focusing lens group in said focusing lens groups; and the following conditional expression being satisfied:

$$0.30 < |fF|/|fRL| < 2.50$$

where fF denotes a focal length of a focus lens group having a strongest refractive power in said focusing lens groups, and fRL denotes a focal length of a lens having a strongest refractive power in said at least one lens component; and wherein the following conditional expression is satisfied;

$$2.00 < D1Mw/fw < 4.00$$

where D1Mw denotes a distance along the optical axis between the first lens group and the first intermediate lens group in the wide angle end state, and fw denotes a focal length of the variable magnification optical system in the wide angle end state.

2. A variable magnification optical system according to claim 1, wherein
the following conditional expression is satisfied:

$$0.70 < |fF|/ft < 3.30$$

where fF denotes a focal length of a focusing lens group having a strongest refractive power in the focusing lens groups, and ft denotes a focal length of the variable magnification optical system in the telephoto end state.

3. A variable magnification optical system according to claim 1, wherein
the following conditional expression is satisfied:

$$0.60 < f1N/f1 < 2.00$$

where f1N denotes a focal length of a lens having a strongest negative refractive power in the first lens group, and f1 denotes a focal length of the first lens group.

4. A variable magnification optical system according to claim 1, wherein
the following conditional expression is satisfied:

$$2.00 < D1Mw/fw < 4.00$$

where D1Mw denotes a distance along the optical axis between the first lens group and the first intermediate lens group in the wide angle end state, and fw denotes a focal length of the variable magnification optical system in the wide angle end state.

5. A variable magnification optical system according to claim 1, wherein
the following conditional expression is satisfied:

$$2.00 < vM1P/vM1N < 3.00$$

where vM1P denotes an Abbe's number of a lens having a strongest positive refractive power in the first intermediate lens group, and vM1N denotes an Abbe's number of a lens having a strongest negative refractive power in the first intermediate lens group.

6. A variable magnification optical system according to claim 1, wherein the following conditional expression is satisfied:

$$0.20 < |fM1P/fM1N| < 0.80$$

where fM1P denotes a focal length of a lens having a strongest positive refractive power in the first intermediate lens group, and fM1N denotes a focal length of a lens having a strongest negative refractive power in the first intermediate lens group.

7. A variable magnification optical system according to claim 1, wherein $$38.00° < ωw < 85.00°$$

where ωw denotes a half angle of view of the variable magnification optical system in the wide angle end state.

8. A variable magnification optical system according to claim 1, wherein said focusing lens group is composed of one or two lenses.

9. A variable magnification optical system according to claim 1, wherein said first intermediate lens group comprises at least two lenses having negative refractive power.

10. A variable magnification optical system according to claim 1, wherein said first lens group is composed of two lens components.

11. A variable magnification optical system according to claim 1, wherein at least one of the focusing lens groups has positive refractive power.

12. A variable magnification optical system according to claim 1, wherein said first intermediate lens group comprises, in order from the object side, a second lens group having positive refractive power and a third lens group having positive refractive power.

13. A variable magnification optical system according to claim 1, wherein said rear lens group comprises at least two focusing lens groups.

14. An optical apparatus comprising a variable magnification optical system according to claim 1.

15. A method for manufacturing a variable magnification optical system which comprises, in order from an object side, a first lens group having negative refractive power, a first intermediate lens group having positive refractive power, a second intermediate lens group having negative refractive power and a rear lens group, comprising the steps of: constructing such that, upon varying a magnification from a wide angle end state to a telephoto end state, a distance between said first lens group and said first intermediate lens group is varied, a distance between said first intermediate lens group and said second intermediate lens group is varied, and a distance between said second intermediate lens group and said rear lens group is varied; constructing such that said rear lens group comprises at least one focusing lens group which is moved upon carrying out focusing from an infinite distance object to a close distance object and at least one lens component at an image side of the most image side focusing lens group in said focusing lens groups; and constructing such that the following conditional expression is satisfied:

$$0.30 < |fF|/|fRL| < 2.50$$

where fF denotes a focal length of a focus lens group having a strongest refractive power in said focusing lens groups, and fRL denotes a focal length of a lens having a strongest refractive power in said at least one lens component; and wherein the following conditional expression is satisfied;

$$2.00 < D1Mw/fw < 4.00$$

where D1Mw denotes a distance along the optical axis between the first lens group and the first intermediate lens group in the wide angle end state, and fw denotes a focal length of the variable magnification optical system in the wide angle end state.

16. A variable magnification optical system according to claim 1, wherein
the following conditional expression is satisfied:

$$0.10 < BFw/fw < 1.00$$

where BFw denotes a back focus of said variable magnification optical system in the wide angle end state, and fw denotes a focal length of said variable magnification optical system in the wide angle end state.

* * * * *